US010855564B2

(12) United States Patent
Korkin et al.

(10) Patent No.: US 10,855,564 B2
(45) Date of Patent: *Dec. 1, 2020

(54) VISUALIZATION OF NETWORK DATA AS A THREE-DIMENSIONAL HIERARCHICAL DATA STRUCTURE IN A MIXED REALITY ENVIRONMENT

(71) Applicant: WORCESTER POLYTECHNIC INSTITUTE, Worcester, MA (US)

(72) Inventors: Dmitry Korkin, Worcester, MA (US); Pavel Terentiev, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,391

(22) Filed: Jan. 15, 2019

(65) Prior Publication Data
US 2019/0394103 A1    Dec. 26, 2019

Related U.S. Application Data

(63) Continuation-in-part of application No. 15/871,632, filed on Jan. 15, 2018.

(51) Int. Cl.
*H04L 12/26* (2006.01)
*G06T 19/00* (2011.01)

(52) U.S. Cl.
CPC ......... *H04L 43/045* (2013.01); *G06T 19/003* (2013.01); *G06T 19/006* (2013.01); *H04L 43/08* (2013.01); *H04L 43/10* (2013.01)

(58) Field of Classification Search
None
See application file for complete search history.

(56) References Cited

U.S. PATENT DOCUMENTS

| 6,020,891 | A | * | 2/2000 | Rekimoto ........... G06F 3/04815 |
| | | | | 345/419 |
| 9,665,988 | B2 | | 5/2017 | Djorgovski et al. |
| 9,704,298 | B2 | | 7/2017 | Espeset et al. |

(Continued)

OTHER PUBLICATIONS

Daniel Belcher et al, "Using Augmented Reality for Visualizing Complex Graphs in Three Demensions", Proceedings of the Second IEEE and ACM International Symposium on Mixed and Augmented Reality, 2003.

(Continued)

*Primary Examiner* — Nicholas J Lee
(74) *Attorney, Agent, or Firm* — Duquette Law Group, LLC

(57) ABSTRACT

A mixed reality device includes a mixed reality display and a controller disposed in electrical communication with the mixed reality display. The controller is configured to display a hierarchical data structure as a virtual object in a 3D space on the mixed reality display, the hierarchical data structure constructed from topology data associated with a network and three-dimensional (3D) embedded network data associated with the network; receive a hierarchy traversal command relative to at least one node of a first level of the hierarchical data structure; and, in response to receiving the hierarchy traversal command, display at least one node of the second level of the hierarchical data structure on the mixed reality display.

25 Claims, 18 Drawing Sheets

(56) References Cited

U.S. PATENT DOCUMENTS

| | | | |
|---|---|---|---|
| 2008/0123586 A1 | 5/2008 | Manser | |
| 2012/0056903 A1* | 3/2012 | Shinohara | G06F 3/0482 345/676 |
| 2017/0053445 A1 | 2/2017 | Chen et al. | |
| 2017/0287225 A1 | 10/2017 | Powderly et al. | |

OTHER PUBLICATIONS

C. Hurter et al, Into the mixed reality data sphere: mapping user's movements to data exploration tool, Workshop on Immersive Analytics at IEEE VIS, Oct. 1, 2017.

Aliakbar Panahi, "Big Data Visualization Platform for Mixed Reality", Virginia Commonwealth University, VCU Scholars Compass, 2017.

Aileen McGraw, "Making Mixed Reality: A Conversation With Alexandros Sigaras and Sophia Roshal", Microsoft Windows Experience, Sep. 13, 2017, https:/blogs.windows.com/windowsexperience; Visited May 20, 2019.

Christof Karmonik et al, "Workflow for Visualization of Neuroimaging Data with an Augmented Reality Device", J. Digit Imaging (2018) 31:26-31, Published online Jul. 6, 2017.

Steve Beitzel et al, "Exploring 3D Cybersecurity Visualization with the Microsoft HoloLens" Advances in Human Factors in Cybersecurity, part of the Advances in Intelligent Systems and Computing 593, Springer International Publishing AG 2018.

Michael Peters, "HoloLens: Interactive Visulization", Published Jan. 22, 2017, https://www.youtube.com/watch?v=PE2DStC0flg &feature=share; Visited Jun. 18, 2019.

Michael Peters, HoloLens: Inside The 'Data Room', Published Jan. 4, 2018, https://www.youtube.com/watch?v=uOEtnZUinfs; Visited Jun. 18, 2019.

Wolfgang Buschel et al, "Investigating Link Attributes of Graph Visualizations in Mobile Augmented Reality" MobileVis '18 Workshop at CHI 2018, Apr. 21, 2018, Montreal, QC, Canada.

Pietro Cipresso et al; "The Past, Present, and Future of Virtual and Augmented Reality Research: A Network and Cluster Analysis of the Literature"; Frontiers in Psychology, Nov. 2018, vol. 9, Article 2086.

Leah Small; "Augmented Reality Revolutionizes Surgery and Data Visualization for VCU Researchers"; VCU News, Apr. 2, 2018; https://news.vcu.edu/health/augmented_reality_revolutionizes_surgery_and_data_visualization, visited May 20, 2019.

In Formation, Inc.; "Loci-Link In Your Mind method of loci mixed reality mind mapping", https://www.youtube.com/watch?v=_PvATogqGKk&feature=youtu.be; Visited Jun. 18, 2019.

Wolfgang Buschel et al Augmented Reality Graph Visualizations Investigation of Visual Styles in 3D Node-Link Diamgrams; DOI10.1109/MGG.2019.2897927, IEEE Computer Graphics and Application, 2018.

International Search Report dated Mar. 8, 2019 from Corresponding International Application No. PCT/US2019/013670.

* cited by examiner

VISUALIZATION OF NETWORK DATA AS A THREE-DIMENSIONAL HIERARCHICAL DATA STRUCTURE IN A MIXED REALITY ENVIRONMENT

RELATED APPLICATIONS

This patent application is a continuation-in-part of, and claims the benefit to, U.S. application Ser. No. 15/871,632, filed on Jan. 15, 2018, entitled, "Visualization of Network Data as a Three-Dimensional Hierarchical Data Structure in a Mixed Reality Environment," the contents and teachings of which are hereby incorporated by reference in their entirety.

GOVERNMENT LICENSE RIGHTS

This invention was made with government support under Grant # DBI-1458267 awarded by the National Science Foundation (NSF). The government has certain rights in the invention.

BACKGROUND

In a variety of data-intensive fields of study, including biology, finance, computer science, and the pharmaceutical and biotech industries, interrelated data elements can be visualized as a network. For example, complex diseases such as cancer, diabetes, and heart disorders can be represented as relatively large biomolecular networks formed by the genes implicated in the disease. These networks are typically presented visually in a two-dimensional space as a series of objects or nodes having edges that connect related nodes.

SUMMARY

Conventional network visualization approaches suffer from a variety of deficiencies. For example, regardless of the field of study, visualization of relatively large networks typically does not allow a user to intuitively understand the real-world objects represented by the structure or the phenomenon identified by the visualized network. For example, when complex networks are visually represented in a two-dimensional space, nodes and edges can overlap one another. With such conventional depiction, it can be difficult for user to fully visualize and understand the relationships among the nodes. This can lead to an incomplete understanding of the phenomena represented by the visual representation of the network.

Further, the visual representation of relatively large networks in a two-dimensional space can provide information that is typically beyond the capacity of human perception. For example, FIG. 1 represents a visual depiction of a molecular network 5 for an ovarian cancer cell. This two-dimensional representation of a relatively complex biological network depicts a relatively complex and dense system of nodes and connections. With such a complex depiction, it becomes nearly impossible for a user to intuitively understand the intricacies of the underlying system structure and/or the irregularities that occur therein.

By contrast to conventional visualization techniques, embodiments of the present innovation relate to visualization of network data as a three-dimensional (3D) hierarchical data structure in a mixed reality environment. In one arrangement, a mixed reality device is configured to allow a user to visualize and manipulate static or dynamically-changing network data as a 3D structure as part of a mixed reality image. For example, the mixed reality device is configured to map the physical environment of the user's surroundings and bind it to an artificial holographic coordinate system. With such binding, the mixed reality device can visually represent all nodes (i.e., objects) with or without edges (i.e., interconnections) associated with the network data. By projecting the hierarchical data structure as a 3D structure as part of a mixed reality image, the mixed reality device provides the user with an intuitive way to interact and understand the data.

For example, 3D visualization of the hierarchical data structure as part of a mixed reality image versus a two-dimensional representation of the network data on a monitor provides the human brain with a clearer way to identify interconnections between nodes. Further, 3D visualization of the hierarchical data structure as part of a mixed reality image allows the user to walk through the visual representation of the network, which is, in itself, a more natural method for exploration. Additionally, the mixed reality device allows for a natural hand gesture manipulation without the need of additional devices, allows intuitive anchoring of the virtual object to the surroundings of the real-world environment, and allows for a natural collaborative interaction, such as when users wearing mixed reality devices can interact with each other and with the holographic hierarchical data structure object simultaneously.

In one arrangement, the mixed reality device is also configured to display network data as a hierarchical data structure such that, at each level of hierarchy, only a subset of nodes and/or edges are shown. Each level of the hierarchy includes a predefined information link between the two neighbor levels. The information link allows the user to change the network representation from a coarser-grain view (level k) to a finer-grain, more detailed, view (level k+1). The hierarchical representation of the network data provides the user with the ability to efficiently visualize, process, and manipulate the network information.

In one arrangement, the mixed reality device is configured to provide interactive manipulation of the network using object manipulation input commands, such as gaze input, gesture input, and voice input commands. In response to one or more of these commands, the mixed reality device allows the user to traverse, rotate, scale, and/or move the hierarchical data structure, as well as to search for particular information in the network.

In one arrangement, each node in the hierarchical data structure can include a number of features, such as an image, video, chart, plot, or text, for example. For example, features related to the nodes (i.e., objects) and edges (i.e., interconnections) associated with the network data can be mapped on the hierarchical data structure and interactively accessed by the user, such as by providing a gesture command relative to a corresponding node or edge.

In one arrangement, the mixed reality device is configured to provide the user with assistance in retrieving significant information related to the nodes and edges of the hierarchical data structure. For example, the mixed reality device can interact with the user and can suggest if there is significant information in certain regions of a complex network, such as if there are nodes and edges that are related to a particular node based on the available data. In one arrangement, for specific nodes and/or edges that are determined by the system to be important for a specific task, the mixed reality device can highlight such nodes in a visibly distinct manner to identify these nodes to the user.

In one arrangement, embodiments of the innovation relate to, in a mixed reality device, a method for displaying a network structure, comprising displaying, by the mixed reality device, a hierarchical data structure as a virtual object in a 3D space on the mixed reality display, the hierarchical data structure constructed from topology data associated with a network and three-dimensional (3D) embedded network data associated with the network; receiving, by the mixed reality device, a hierarchy traversal command relative to at least one node of a first level of the hierarchical data structure; and in response to receiving the hierarchy traversal command, displaying, by the mixed reality device, at least one node of the second level of the hierarchical data structure on the mixed reality display.

In one arrangement, embodiments of the innovation relate to a mixed reality device having a mixed reality display and a controller disposed in electrical communication with the mixed reality display. The controller is configured to display a hierarchical data structure as a virtual object in a 3D space on the mixed reality display, the hierarchical data structure constructed from topology data associated with a network and three-dimensional (3D) embedded network data associated with the network; receive a hierarchy traversal command relative to at least one node of a first level of the hierarchical data structure; and, in response to receiving the hierarchy traversal command, display at least one node of the second level of the hierarchical data structure on the mixed reality display.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to visualization of network data as a three-dimensional (3D) hierarchical data structure in a mixed reality environment. In one arrangement, a mixed reality device is configured to allow a user to visualize and manipulate static or dynamically-changing network data as a 3D structure as part of a mixed reality image. For example, the mixed reality device is configured to map the physical environment of the user's surroundings and bind it to an artificial holographic coordinates system. With such binding, the mixed reality device can visually represent all nodes (i.e., objects) with or without edges (i.e., interconnections) associated with the network data. By projecting the network data as a 3D structure as part of a mixed reality image, the mixed reality device provides the user with an intuitive way to interact and understand the data. For example, 3D visualization of the hierarchical data structure as part of a mixed reality image versus a two-dimensional representation of the network data on a monitor provides the human brain with a clearer way to identify interconnections between nodes. Further, 3D visualization of the hierarchical data structure as part of a mixed reality image allows the user to walk through the visual representation of the network, which is, in itself, a more natural method foe exploration.

Figure 2:
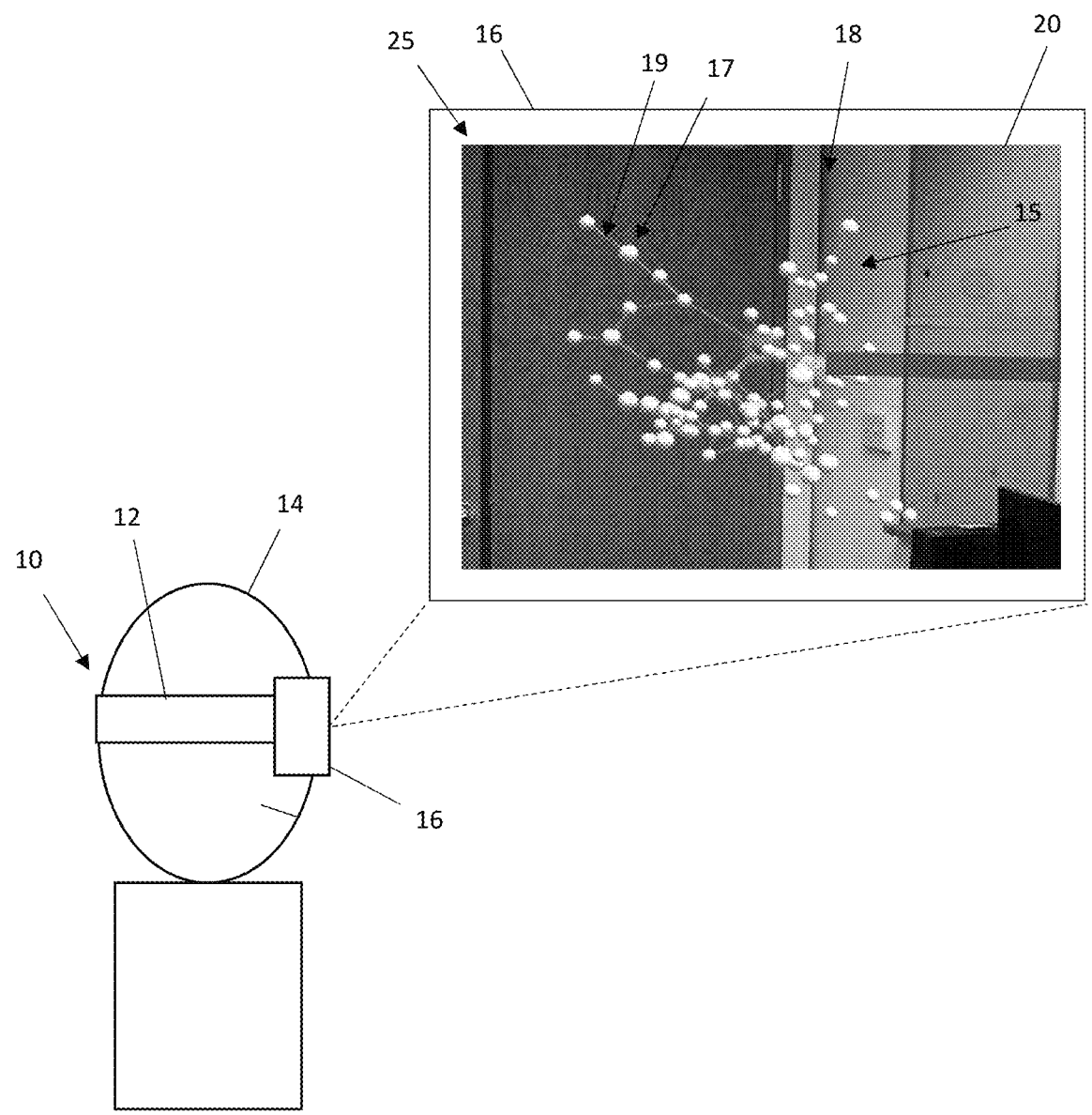
FIG. 2 illustrates a schematic representation of a mixed reality device and a virtual object provided by the mixed reality device, according to one arrangement.

FIG. 2 illustrates a schematic representation of a mixed reality device 10, according to one arrangement. As illustrated, the mixed reality device 10 includes a headpiece 12, which is worn by a user on the user's head 14, and a mixed reality display 16 which is disposed in the vicinity of the user's eyes. During operation, the mixed reality device 10 is configured to display a level of a hierarchical data structure 15 as a virtual object 18 in conjunction with a real-world 3D environment 20. Taken together, the virtual object 18 and real-world 3D environment 20 form a mixed reality image 25.

In one arrangement, a hierarchical data structure 15 can be defined as a layout of nodes 17 (i.e., objects), as represented as 3D graphical objects, and edges 19 (i.e., interconnections) which interconnect the nodes 17. When displaying a level of the hierarchical data structure 15, as shown in FIG. 2, the mixed reality device 10 can display each node 17 with different geometrical shapes such as spheres, cubes, cylinders, or custom shapes for example. In one arrangement, the mixed reality device 10 utilizes these different geometrical shapes to distinguish certain nodes from other nodes based upon a distinguishing characteristic, such as domain type, value, or metric differences for example. Further, the mixed reality device 10 can display each edge 19 with a geometrical shape which is distinct from the shape of the nodes 17. For example, the edges 19 can be displayed as straight lines between related or interconnected nodes 17. It is noted that while the mixed reality device 10 can display both nodes 17 and edges 19 together as the virtual object 18, the mixed reality device 10 can also be configured to display the nodes 17 of the hierarchical data structure 15 as the virtual object 18, without the interconnecting edges 19. Further, the mixed reality device 10 can also be configured to display interconnecting edges 19 of the hierarchical data structure 15 as the virtual object 18, without the nodes 17.

As indicated in FIG. 2, and as will be described in detail below, the mixed reality device 10 allows the user to view both the virtual object 18 in conjunction with real-world surroundings, such as indicated by real-world 3D environment 20 on the mixed reality display 16. By projecting a level of the hierarchical data structure 15 as a 3D object 18 as part of a hologram and as part of a mixed reality image 25, the mixed reality device 10 provides the user with an intuitive way to interact and understand the underlying network data (e.g., such as from the fields of biology, finance, computer science, or biotechnology) which is represented as the hierarchical data structure 15.

Figure 3:
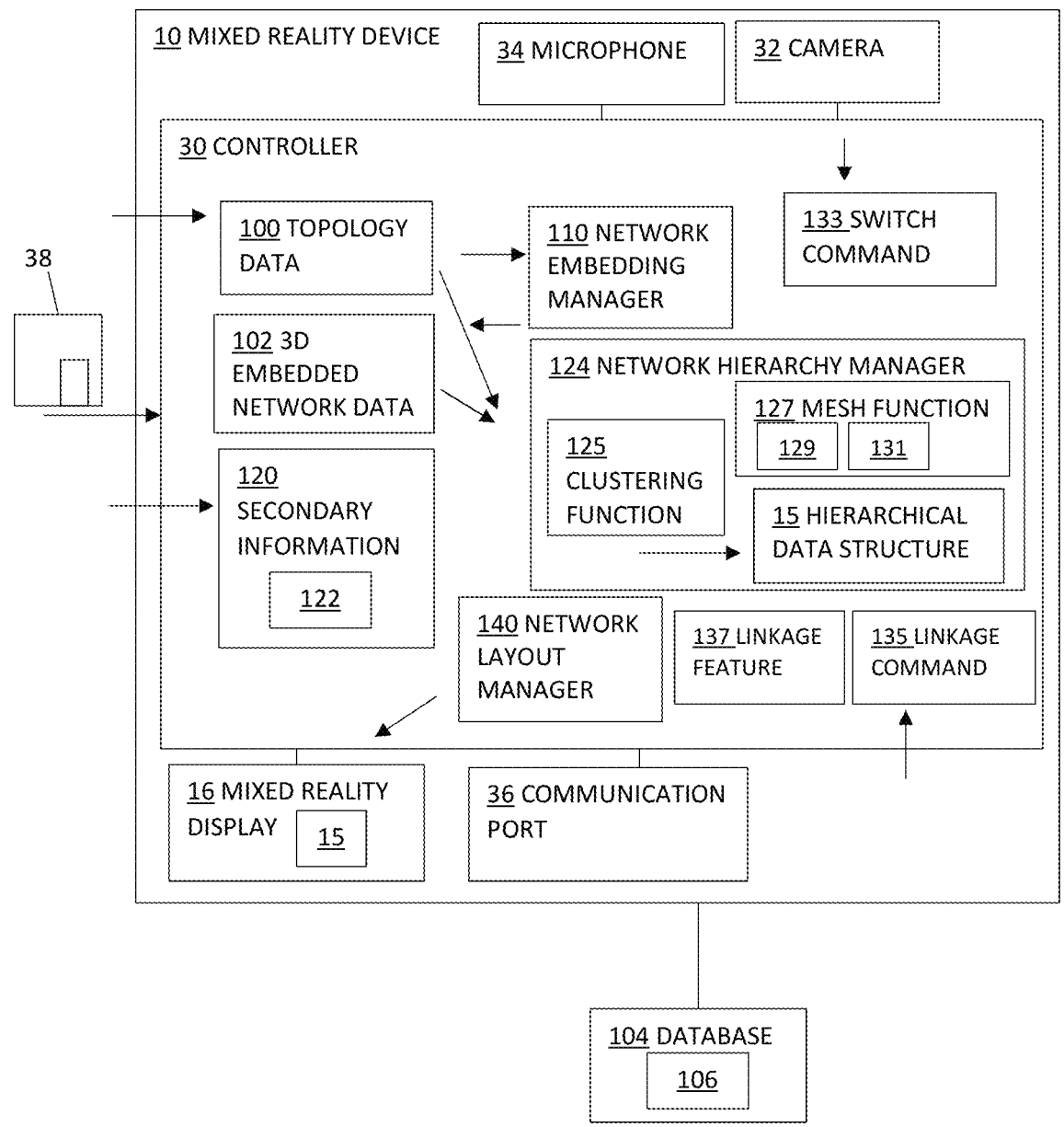
FIG. 3 illustrates a schematic representation of the mixed reality device of FIG. 2, according to one arrangement.

FIG. 3 illustrates a schematic representation of the mixed reality device 10 of FIG. 2, according to one arrangement. For example, the mixed reality device 10 includes a controller 30, such as a memory and a processor. The mixed reality device 10 can include one or more cameras 32 disposed in electrical communication with the controller 30 and configured to capture the real-world 3D environment as viewed by the user. For example, the cameras 32 can be configured to capture a stereoscopic moving image of the real-world 3D environment 20 and to send the image to the controller 30 for further transmission to the mixed reality display 16.

As provided above, the mixed reality device 10 includes a mixed reality display 16. For example, the mixed reality display 16 can be a liquid crystal on silicon (LCOS) display, a transmissive liquid crystal display (LCD), or a matrix arrays of LEDs. In one arrangement, the mixed reality display 16 is disposed in electrical communication with the controller 30 and is configured to provide the mixed reality image 25 to a user. For example, the mixed reality display 16 is configured to display a combination of the real-world 3D environment 20 image and the virtual object 18 image, as received from the controller 30, as the mixed reality image 25 to the user.

In one arrangement, the mixed reality device 10 can also include one or more microphones 34 and a communication port 36, each disposed in electrical communication with the controller 30. The microphones 34 are configured to receive audio input from the user and to provide the audio input as an audio signal to the controller 30. The communication port 36 is configured to exchange communications with a device, such as a computerized device, gateway, or database 104, external to the mixed reality device 10. For example, the communication port 36 can be a wired interface or a wireless, such as a Wifi interface or a Bluetooth interface.

It is noted that while the mixed reality device 10 can be configured in a variety of ways, in one arrangement, the mixed reality device 10 is configured as a MICROSOFT HoloLens device as produced by Microsoft Corporation, Redmond, Wash.

The controller 30 of the mixed reality device 10 can store an application for visualizing network data as a 3D hierarchical data structure in a mixed reality environment. The visualization application installs on the controller 30 from a computer program product 38. In some arrangements, the computer program product 38 is available in a standard off-the-shelf form such as a shrink wrap package (e.g., CD-ROMs, diskettes, tapes, etc.). In other arrangements, the computer program product 38 is available in a different form, such downloadable online media. When performed on the controller 30 of the mixed reality device 10, the visualization application causes the mixed reality device 10 to display a 3D hierarchical data structure 15 and a real-world 3D environment image 20 as part of a mixed reality image 25. Further, when performed on the controller 30 of the mixed reality device 10, the visualization application causes the mixed reality device 10 to receive object manipulation input from a user and to adjust the display of the hierarchical data structure 15 on the mixed reality display 16.

As provided above, during operation, the mixed reality device 10 is configured to display network data of a hierarchical data structure 15 as a virtual object 18 on a mixed reality display 16. The following provides a description of an example of such an operation of the mixed reality device 10.

Before network data that is under investigation can be visualized by the mixed reality device 10, the mixed reality device 10 first receives the network data, such as from an external database 104, and formats the network data to include all interconnections between nodes, their parameters, and spatial coordinates for display. For example, with reference to FIG. 3, the mixed reality device 10 is configured to receive node attribute information, topology data 100 associated with a network, and 3D embedded network data 102 associated with the network.

In one arrangement, the node attribute information identifies certain parameters associated with a particular node while the topology data 100 identifies the interconnections or relationships among the nodes. For example, assume the case where the mixed reality device 10 accesses a database 104 which includes molecular network data 106. In such a case, the molecular network data 106 can include, as node attribute information, identification of the proteins that define the network and topology data 100 that identifies the relationships among the nodes or proteins.

In one arrangement, the mixed reality device 10 is configured to develop the 3D embedded network data 102 based upon the topology data 100. For example, the mixed reality device 10 can include a network embedding manager 110 configured to apply an embedding function to the topology data 100 to generate the 3D embedded network data 102. As a result of the application of the embedding function to the topology data 100, the 3D embedded network data 102 identifies an artificial, spatial coordinate for each node of the topology data 100. These spatial coordinates relate to a mapping location of the node in 3D space. The mixed reality device 10 is configured to bind the artificial, spatial coordinates of the nodes of the molecular network, as provided by the 3D embedded network data 102, with a real-world, physical coordinate system as displayed by the mixed reality display 16. For example, by binding the artificial coordinates of the nodes to the real world coordinates, the mixed reality device 10 provides the user with the ability to gain both a perceptional and functional meaning to the display of the hierarchical data structure 17.

The network embedding manager 110 can be configured to provide additional processing of the topology data 100 and/or the 3D embedded network data 102. In one arrangement, the network embedding manager 110 is configured to provide spatial mapping attributes to the 3D embedded network data 102. The level of understanding that the user can gain from the binding of the artificial coordinates to the real world coordinates can depend on how the nodes are grouped in space. As such, the network embedding manager 110 can be configured to provide, as a spatial mapping attribute, an indication of the strength of interaction between nodes. For example, the network embedding manager 110 can provide the interaction strength as a distance between adjacent nodes.

As provided above, the mixed reality device 10 is configured to develop the 3D embedded network data 102 based upon the topology data 100. However, in one arrangement, the mixed reality device 10 can receive the 3D embedded network data 102 from an external source, such as from database 104, along with the node feature information and topology data 100.

In one arrangement, in addition to receiving the topology data 100 and the 3D embedded network data 102, the mixed reality device 10 can receive secondary information 120 related the nodes of the network. The secondary information 120 can be configured in a variety of ways. In one arrangement, the secondary information 120 can relates to a knowledge-domain feature 122 associated with a corresponding node. For example, assume the case each node of a molecular network represents a protein. Each protein can have one or more knowledge-domain features associated with it such as, for example, a number of domains in the protein, a cellular location of the protein (nucleus, cytoplasm, membrane), a disease association, an expression of the gene corresponding to the protein in exact tissue, or a particular structure, mutation, or drug interaction. These knowledge-domain features 122 can be stored in a database local to the mixed reality device 10 and mapped to each associated node 17. As will be described in detail below, the user can access these knowledge-domain features 122 while traversing the hierarchical data structure 15 as provided on the mixed reality display 16.

Next, with continued reference to FIG. 3, the mixed reality device 10 is configured to construct a hierarchical data structure 15 from the topology data 100 and the 3D embedded network data 102.

Figure 1:
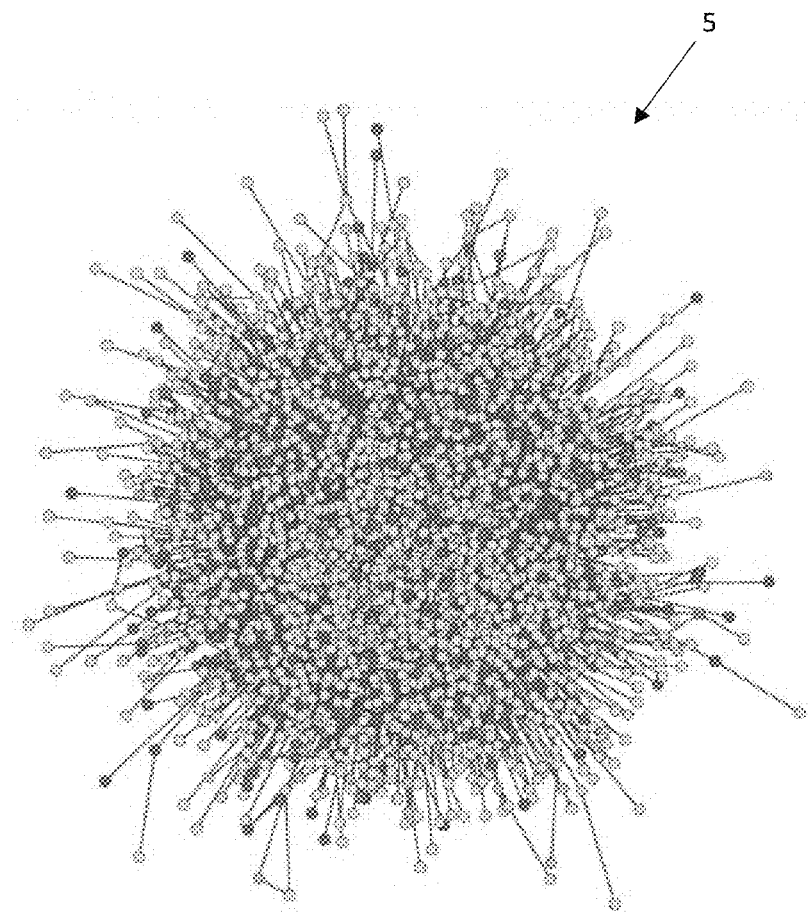
FIG. 1 illustrates a prior art depiction of a molecular network for an ovarian cancer cell.

For example, the topology data 100 in combination with the 3D embedded network data 102 can include hundreds of thousands of network elements having associated 3D coordinates. As indicated in FIG. 1, the visual presentation of such a network can be relatively complex and can lack information regarding the real-world phenomenon identified by the network. In order to allow for an intuitive visual presentation of a network structure, the mixed reality device 10 is configured to provide the topology data 100, in combination with the 3D embedded network data 102, as a hierarchical data structure 15. With such presentation, connections between the nodes 17 are represented as a hierarchical tree in which each level corresponds to some level of node aggregation. The resulting hierarchical data structure 15 can represent a relatively clear and intuitively perceptible data layout of a network and can reduce the computational costs associated with the visualization and manipulation of relatively large amounts of network data.

In one arrangement, the mixed reality device 10 includes a network hierarchy manager 124 which is configured to store the topology data 100, the 3D embedded network data 102, and the secondary information 120 (e.g., network data) for a given network that is under visualization process and to hierarchically organize this network data. In one arrangement, the hierarchical organization of the network data can be represented as a tree having a root, a cluster, and a leaf. The root element is the only element of the hierarchy tree that has no parents and has children configured as clusters on the highest level of hierarchy. The cluster element can have both children and one or more parent. The leaf element is related to the bottom level of the hierarchy tree that has no children elements. The mixed reality device 10 can display the clusters and leafs as nodes 17 of the hierarchical data structure 15.

In one arrangement, the network hierarchy manager 124 is configured to apply a clustering function 125 to the topology data 100, the 3D embedded network data 102, and the secondary information 120 to define the hierarchical data structure 15. Clustering is the task of data classification in such a way that the data elements or nodes in the same group, called a cluster, are more similar to each other than to the objects in other groups or clusters based on different characteristics. Clustering is a conventional technique for statistical data analysis, used in many fields, including machine learning, pattern recognition, image analysis, information retrieval, and bioinformatics. The grouping of nodes into clusters can be achieved by various algorithms that differ significantly in the definition of what constitutes a cluster and how to efficiently find them. For example, known clustering algorithms include hierarchical clustering, centroid-based clustering (i.e., K-Means Clustering), distribution based clustering, and density based clustering.

During operation, when constructing the hierarchical data structure 15 in one arrangement, the network hierarchy manager 124 is configured to apply the clustering function 125 to the topology data 100, the 3D embedded network data 102 and the secondary information 120 to define a set of clusters 130 and a set of edges 19 representing relationships among certain clusters of the set of clusters. For example, with reference to FIG. 4, assume the case where the topology data 100, the 3D embedded network data 102 and the secondary information 120 identifies a set of network elements 126 and a set of edges 128 representing relationships among certain network elements 126. Application of the clustering function 125 to the network elements 126 and edges 128 aggregates certain elements 126 based upon some common relationship among the elements. For example, as illustrated, application of the clustering function 125 to the topology data 100, the 3D embedded network data 102 and the secondary information 120 groups elements 126-1 through 126-4 as a first cluster 130-1, elements 126-5 through 126-7 as a second cluster 130-2, elements 126-8 through 126-10 as a third cluster 130-3, and elements 126-11 through 126-13 as a fourth cluster 130-4.

The network hierarchy manager 124 is configured to then substitute each cluster 130 with a single node 17 corresponding to that cluster 130 and provide corresponding edges 19 among the nodes 17. For example, the network hierarchy manager 124 replaces the first cluster 130-1 with a first node 17-1, the second cluster 130-2 with a second node 17-2, the third cluster 130-3 with a third node 17-3, and the fourth cluster with a fourth node 17-4. Further, in the example provided, the clustering function 125 defines edges 19-1 through 19-3 between node 17-1 and nodes 17-2 through 17-4.

Figure 4:
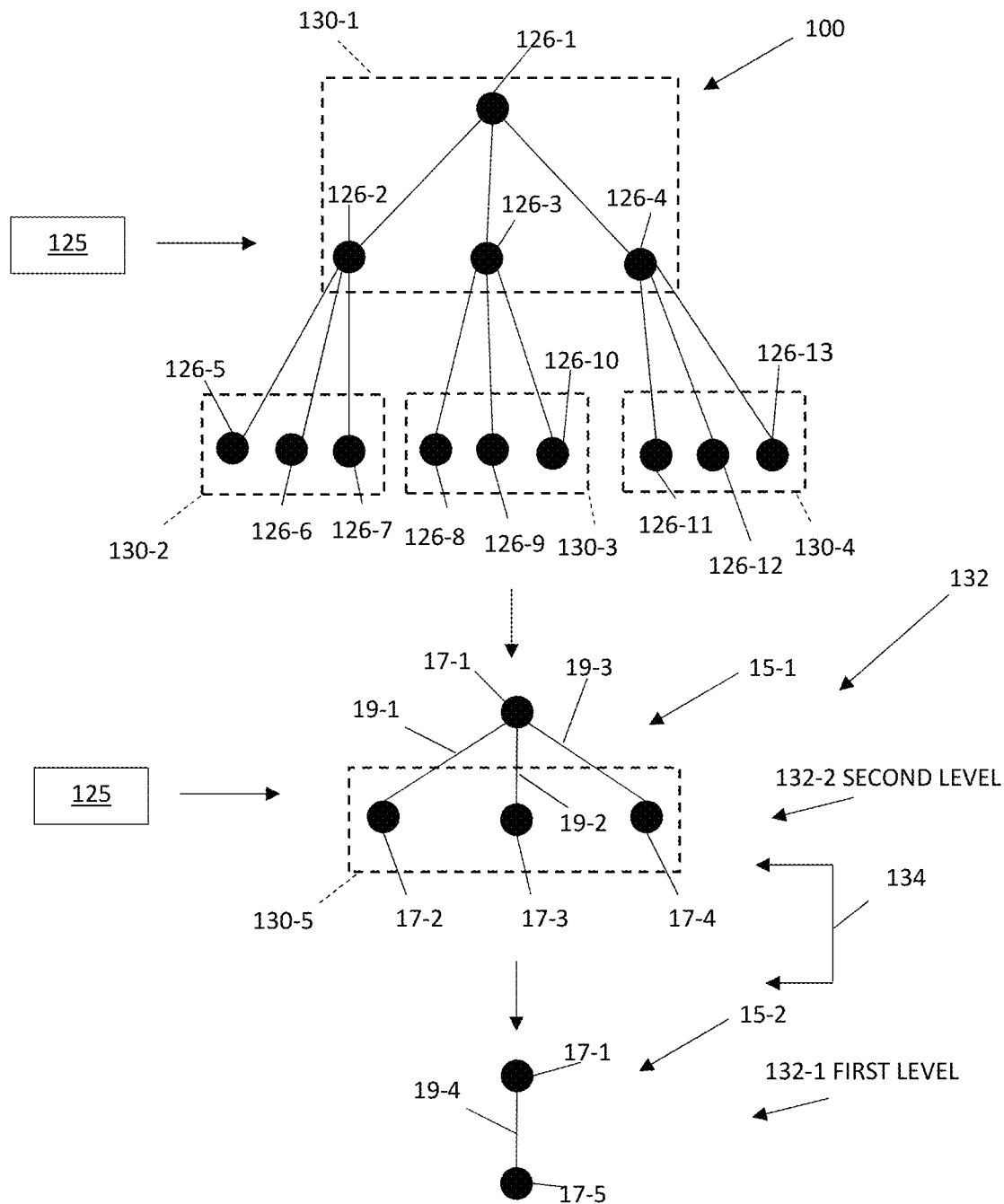
FIG. 4 illustrates a schematic representation of an application of a clustering function to network data to form a hierarchical data structure, according to one arrangement.

To further aggregate the resulting hierarchical data structure 15-1, in one arrangement, the network hierarchy manager 124 is configured to apply the clustering function 125 to the hierarchical data structure 15-1 for additional iterations. For example, as illustrated in FIG. 4, application of the clustering function 125 to the hierarchical data structure 15-1 can group nodes 17-2 through 17-4 as a fifth cluster 130-5 and can define edge 19-4 between node 17-1 and 17-5. With application of the clustering function 125 to the topology data 100, the 3D embedded network data 102 and the secondary information 120 and then iteratively to the resulting nodes 17 and edges 19, the network hierarchy manager 124 defines a set of levels 132 associated with the hierarchical data structure 132.

For example, with continued reference to FIG. 4, based on application of the clustering algorithm 125, the mixed reality device 10 defines a first level 132-1 and a second level 132-2 where the first level 132-1 (level k) provides a coarser-grain representation of the topology data 100, the 3D embedded network data 102 and the secondary information 120 and the second level 132-2 (level k+1) provides a finer-grain, more detailed representation of the topology data 100, the 3D embedded network data 102 and the secondary information 120. Accordingly, each level of the set of levels 132 represents a subset of nodes 17 and a subset of edges 19 of the hierarchical data structure 15. As a result, the network hierarchy manager 124 aggregates the global network structure of the topology data 100, the 3D embedded network data 102 and the secondary information 120 into a hierarchical organization.

Further, based on application of the clustering algorithm 125, the network hierarchy manager 124 can define an information link 134 between two neighboring levels of the set of levels 132. For example, as shown in FIG. 4, the information link 134 defines a relationship or association between the node 17-5 in the first level 132-1 of the hierarchical data structure 15 and the nodes 17-2 through 17-4 in second level 132-2 of hierarchical data structure 15. The information link 134 can be stored in either a local or external database 104 and allows the network hierarchy manager 124 to identify and display either finer or coarser grained hierarchical data structures 15 as the user traverses a particular hierarchical data structures 15 as provided on the mixed reality display 16.

Next, returning to FIG. 3, the mixed reality device 10 is configured to display a level 132 of the hierarchical data structure 15 as a virtual object 18 in a 3D space on a mixed reality display 16 where the level 132 of the hierarchical data structure identifies a subset of nodes 17 and a subset of edges 19 of the hierarchical data structure 15.

As provided above, during operation, the mixed reality device 10 executing the network hierarchy manager 124 can apply a clustering function 125 to the topology data 100, the 3D embedded network data 102, and the secondary information 120 to define the hierarchy data structure 15. As such, each cluster 130 provides a generic representation of an element of a hierarchical data structure 15.

In one arrangement, and with continued reference to FIG. 3, the hierarchical organization of the network data can be configured as a mesh-based representation that includes one or more mesh elements, such as closed 3D mesh elements, having a shape which repeats spatial distribution of separate data points in 3D space. With such a representation, the mixed reality device 10 can substitute a relatively large number of 3D embedded network data elements with a single 3D object. This can reduce the computational load on the controller 30, such as when utilizing standard tessellation algorithms to generate a display of the hierarchical data structure 15. For example, the mixed reality device 10 can utilize conventional tessellation algorithms which may vary depending on the particular application and/or requirements for visualization. As such, each mesh element can provide a more specific or precise representation of a node 17 of a hierarchical data structure 15.

During operation, when constructing the hierarchical data structure 15 to include mesh elements, the network hierarchy manager 124 is configured to apply a mesh function 127 to a selection or subset of the topology data 100, the 3D embedded network data 102, and the secondary information 120 (e.g., data elements) to define an outer surface, or shape, of each of the mesh elements. Following development of the mesh elements, the mixed reality device 10 can display the mesh elements as nodes 17 of a hierarchical data structure 15. The mesh function 127 can define the shape of the mesh elements in a variety of ways.

Figure 10:
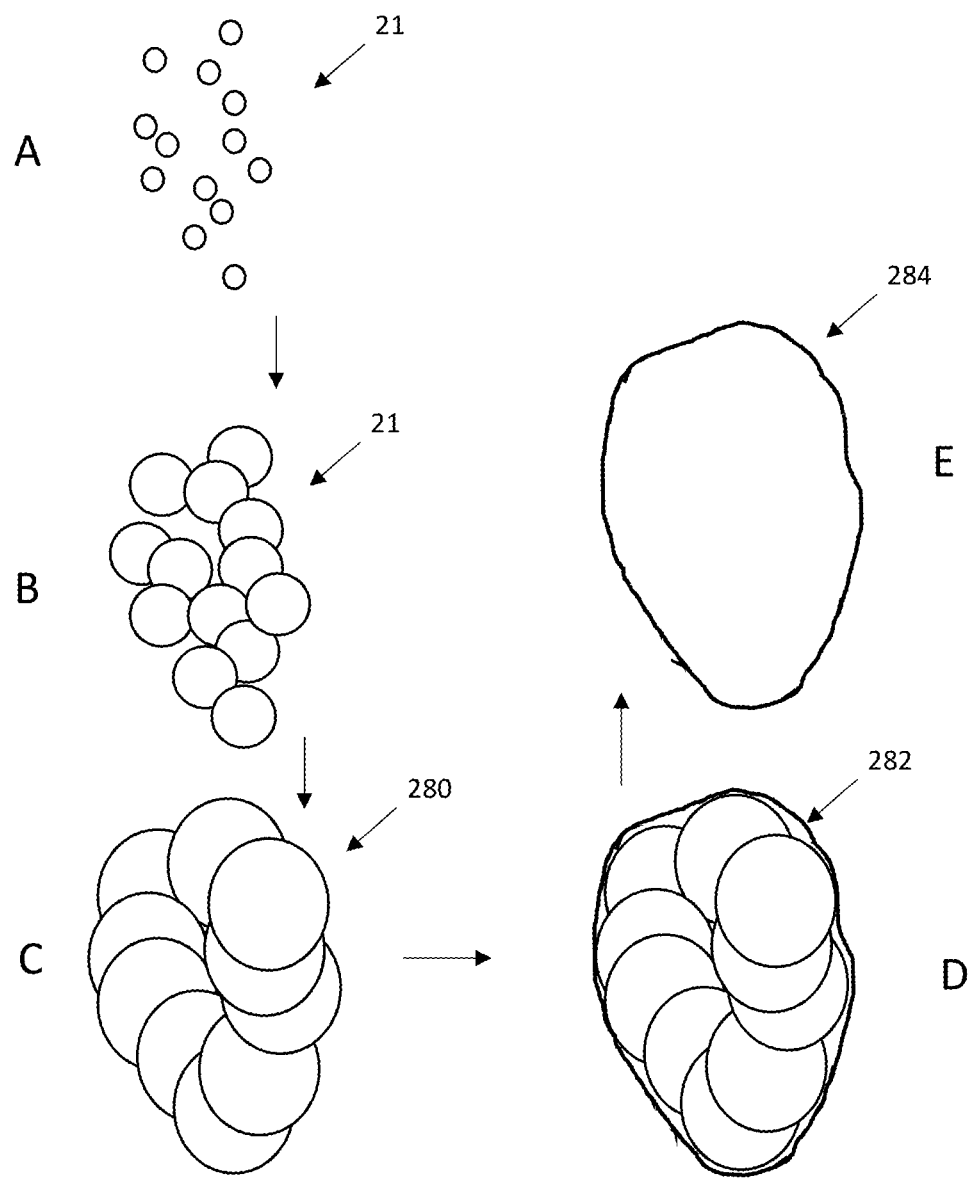
FIG. 10 illustrates a two-dimensional representation of the application of Voronoi diagram principles by a mesh function to define the shape of a mesh element in a three-dimensional volume, according to one arrangement.

In one arrangement, the mesh function 127 can define the shape of a mesh element by utilizing Voronoi diagram principles along with a tessellation algorithm. For example, with reference to FIG. 10, the mesh function 127 can select a group of data elements 21 within a three-dimensional space (FIG. 10A), inflate each data element 21 within a given three-dimensional volume (FIG. 10B) in order to generate a three-dimensional Voronoi diagram 280 (FIG. 10C). The mesh function 127 can then extract or identify an outer surface 282 defined by the inflated nodes of the Voronoi diagram 280 (FIG. 10D) to define a 3D shape of the resulting mesh element 284 (FIG. 10E).

Figure 11:
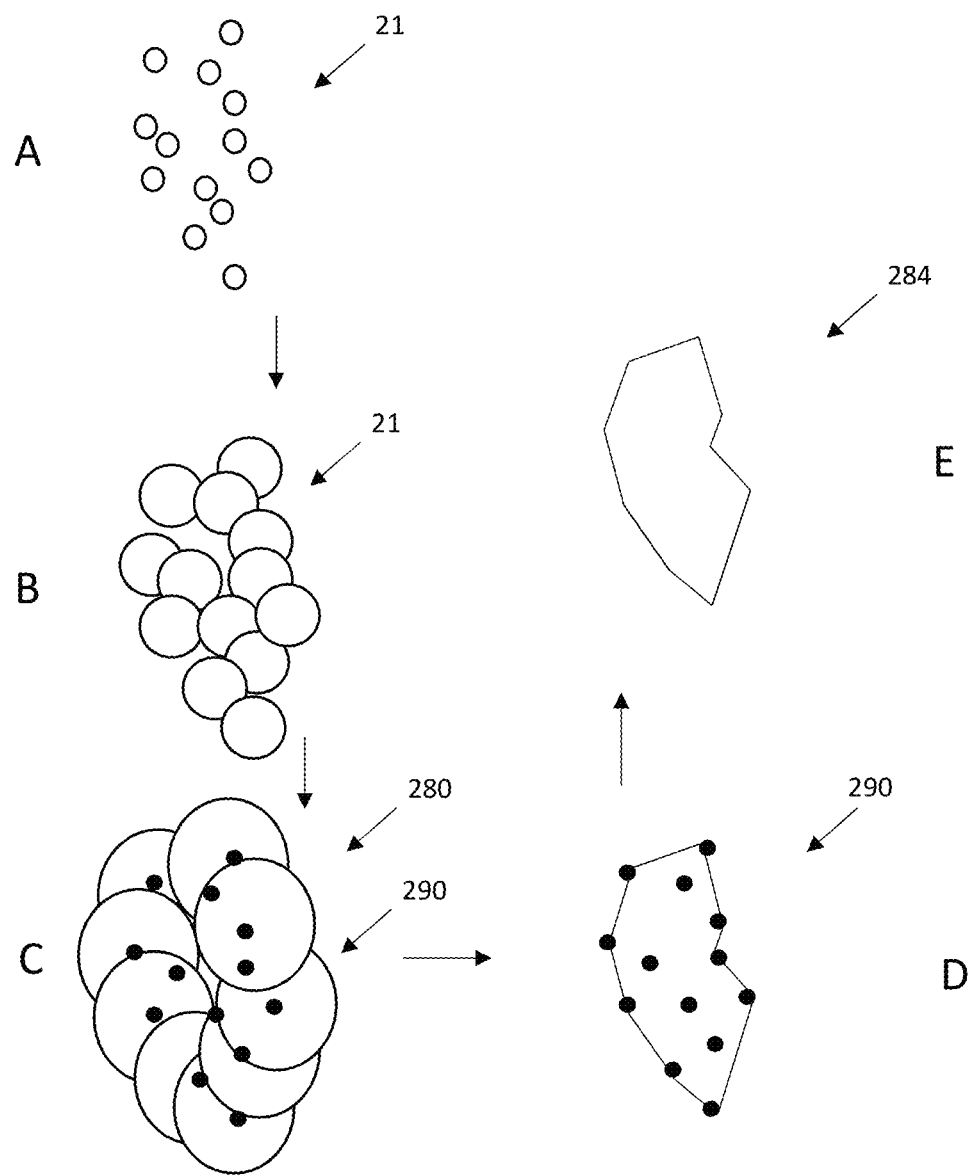
FIG. 11 illustrates a two-dimensional representation of the application of Voronoi diagram principles by a mesh function to define the shape of a mesh element in a three-dimensional volume, according to one arrangement.

In another arrangement, the mesh function 127 can define the shape of a mesh element by generating a three-dimensional Voronoi diagram 280 and extracting hull points from the external facets of the data elements 21. For example, with reference to FIG. 11, the mesh function 127 can select a group of data elements 21 within a three-dimensional space 17 (FIG. 11A), inflate each node within a given three-dimensional volume (FIG. 11B) in order to generate a three-dimensional Voronoi diagram 280 (FIG. 11C). The mesh function 127 can then extract hull points 290 from the original data elements 21 (FIG. 11D) and can define 3D shape of the resulting mesh element 284 based upon the hull points 290 (FIG. 11E). For example, the mesh function 127 can expose the hull points 290 to an explicit triangulation function in order to construct the mesh element 284 which incorporates these hull points 290. In another example, the mesh function 127 can connect the hull points 290 of the three-dimensional volume together to construct the outer surface of the mesh element 284 as a relatively smooth surface.

As described above, the mesh function 127 can define and construct a mesh element 284 based upon a selection of a group of data elements 21 in a three-dimensional volume. In one arrangement, with reference to FIG. 3, the mesh function 127 can apply a statistical manipulation attribute 131 to the mesh element 284. The statistical manipulation attribute 131 can define a percentile of spatial distribution to be associated with the mesh element 284. As a result of the application, the mixed reality device 10 can display a mixed representation of the mesh element which identifies a percentile of spatial distribution associated with the mesh element and a number of data elements that lie beyond the percentile of spatial distribution. With such a mixed representation, the mesh function 127 provides the user with a clearer idea as to the concentration of data elements 21 within the mesh element 284.

Figure 12:
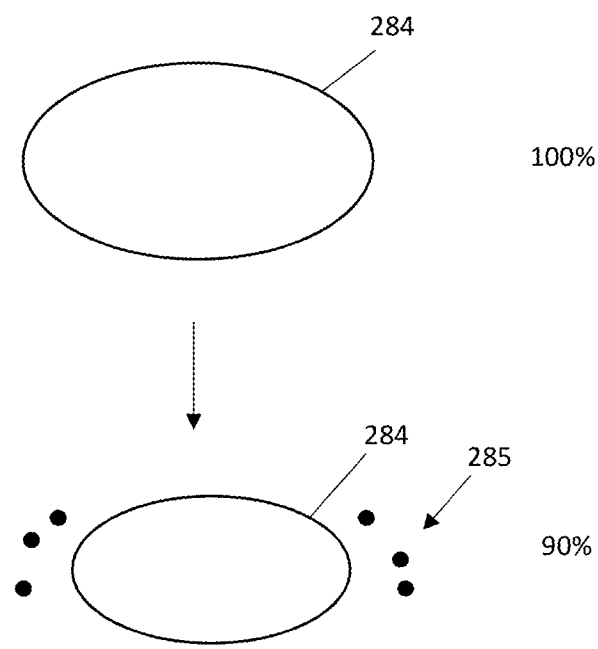
FIG. 12 illustrates application of a statistical manipulation attribute to a mesh element, according to one arrangement.

With reference to FIG. 12, assume the case of a mesh element 284 having a full spatial distribution of points. Also assume the case where the statistical manipulation attribute 131 is configured to identify outlier data elements 285 beyond 90-percentile of spatial distribution. Here, when the mesh function 127 applies the statistical manipulation attribute 131 to the mesh element 284, the mesh function 127 can represent 10% of the mesh element 284 as outlier data elements 285. The outlier data elements 285 can be displayed as separate data points while the mesh function 127 reconstructs the mesh element 284 utilizing the remaining 90% of the data elements 21 within the spatial volume. Additional or alternate statistical manipulation attributes 131 can be applied to the mesh element 284 to identify outlier data elements 285 beyond a variety of percentile spatial distribution levels (e.g., points beyond the 80-percentile of spatial distribution, points beyond the 50-percentile of spatial distribution, etc.).

The mesh elements 284 can have a variety of shapes. For example, with reference to FIG. 13A, one or more mesh elements 284 of a hierarchical data structure 15 can have a convex shape, such as an elliptical shape. In another example, with reference to FIG. 13B, one or more mesh elements 284 of a hierarchical data structure 15 can have a non-convex shape, such as a C-shape as shown, or an S-shape.

As provided above, each mesh element 284 represents a 3D scatter plot layout as a single object. The mesh element 284, therefore, includes information regarding spatial distribution of the separate data points in 3D space. In one arrangement, the mixed reality device 10 can apply the mesh function 127 to a mesh element 284 to generate a spatial distribution attribute 129 for that mesh element 284. The mixed reality device 10 can then display the spatial distribution attribute 129 as part of the mesh element 284. With such a display, the spatial distribution attribute 129 can identify how data elements within each mesh element 284 are distributed.

The spatial distribution attribute 129 can be configured in a variety of ways. In one arrangement, the spatial distribution attribute 129 is configured as a color attribute, such as a heat map, applied to the outer surface of the mesh element 284. The color attribute allows a user to achieve a sense of a data point density distribution within the mesh element 284. The user can identify particular mesh elements 284 having particular density distributions for further investigation.

With reference to FIG. 3, the mesh function 127 can be configured to determine the spatial distribution attribute 129 for each mesh element 284 within a hierarchical data structure 15. In one arrangement, such determination of the spatial distribution attribute 129 for a mesh element 284 can depend upon the mesh element's shape.

Figure 13:
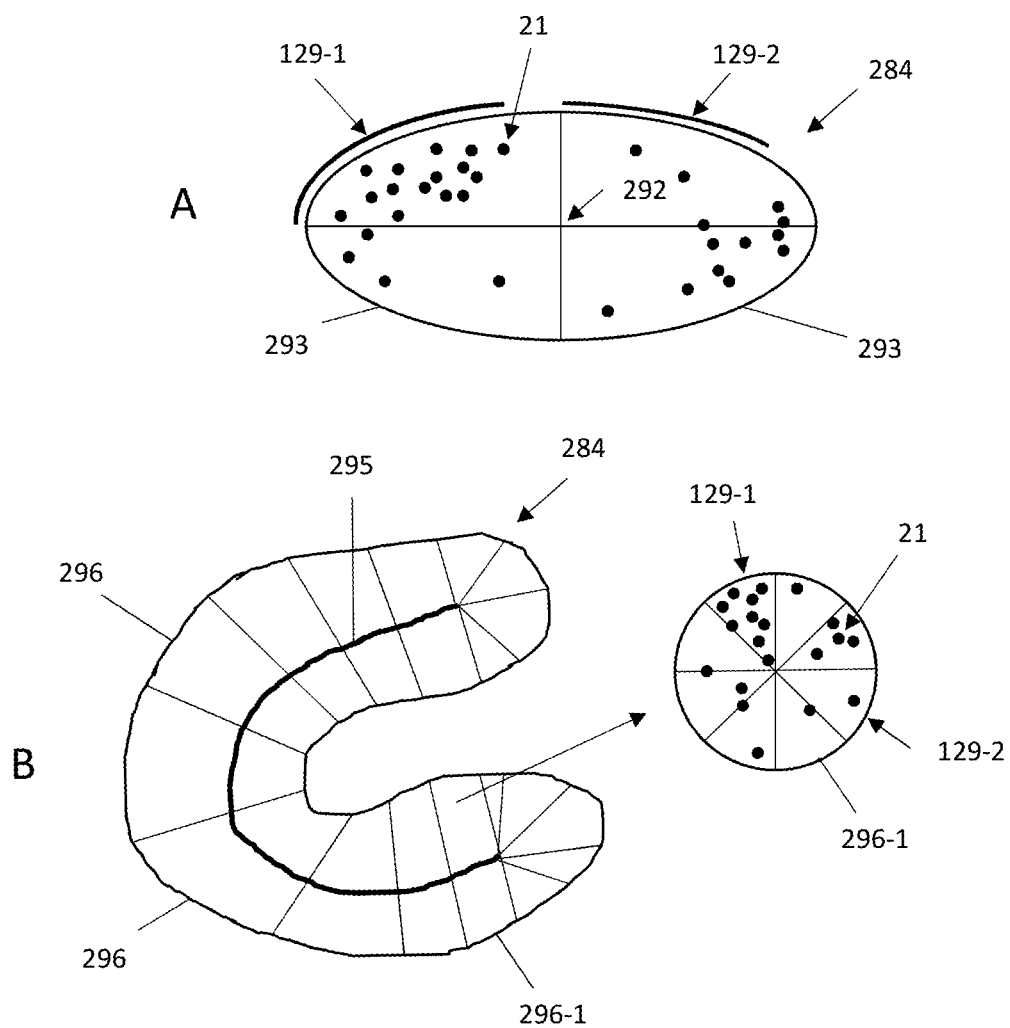
FIG. 13A illustrates a mesh element having a convex shape, according to one arrangement.
FIG. 13B illustrates a mesh element having a non-convex shape, according to one arrangement.

For example, with reference to FIG. 13A, assume the case where mixed reality device 10 identifies the mesh element 284 as having a convex or elliptical shape. During operation, the mesh function 127 can detect a center of mass 292 for the 3D elliptical mesh element 284. Relative to the center of mass 292, the mesh function 127 can divide the mesh element 284 into sectors 293, such as sectors having substantially equivalent volumes or angles. The mesh function 127 then identifies the number of data elements 21 within each sector 293 and applies the spatial distribution attribute 129, such as a color attribute, to the outer surface of the mesh element 284 based upon the number of identified data elements 21.

For example, the mesh function can apply a first spatial distribution attribute 129-1, such as a darker color (e.g., blue, indigo, violet), to the outer surface of the sector 293 having a relatively large number of data elements 21 and a second spatial distribution attribute 129-2, such as a lighter color (e.g., red, orange yellow), to the outer surface of the sector 293 having a relatively fewer number of data elements 21. As such, the darkness or lightness a color can show the weight of each mesh (e.g., a relative number of data elements 21 which are contained within a given sector 293). Further, the mesh function 127 can adjust the brightness of a given color to show spatial distribution of the data elements 21 within a given sector 293.

In another example, with reference to FIG. 13B, assume the case where mixed reality device 10 identifies the mesh element 284 having a non-convex or C-shape. During operation, the mesh function 127 can detect a skeleton or center line 295 of the 3D mesh element 284. The mesh function 127 then divides the mesh element 284 into sectors 296 along the skeleton 295. The mesh function 127 then identifies the number of data elements 21 within each sector 296 and applies the spatial distribution attribute 129, such as a color attribute, to the outer surface of the mesh element 284 based upon the number of identified data elements 21 within each sector 296. For example, for sector 296-1, the mesh function can apply a first spatial distribution attribute 129-1, such as a darker color (e.g., blue, indigo, violet), to the outer surface of the sector 293 having a relatively large number of data elements 21 and a second spatial distribution attribute 129-2, such as a lighter color (e.g., red, orange yellow), to the outer surface of the sector 293 having a relatively fewer number of data elements 21.

As provided above, the mesh function 127 is configured to construct the mesh elements 284 based upon the topology data 100, the 3D embedded network data 102, and the secondary information 120 (e.g., nodes 17) of a network. In one arrangement, the mesh function 127 can construct the mesh elements 284 to represent a set of selected clusters. For example, in the case where the mixed reality device 10 represents a hierarchical data structure 15 as a set of clusters 130 within a spatial region, during operation the mesh function 127 can substitute one or more clusters 130 of the set of clusters with one or more mesh elements 284. The mesh function 127 can also adjust the colors of the mesh elements 284 to represent their density values and to distinguish the mesh elements 284 among each other. For non-selected clusters 130 not included in any of the constructed mesh elements 284, the mesh function 127 can set the non-selected clusters 130 as invisible within the displayed hierarchical data structure 15 or can represent the clusters 130 as separate data points (e.g., nodes 17) within the hierarchical data structure 15. Accordingly, mesh function 127 can provide the mixed representation of mesh element 284 and clusters 130 within the display of a single hierarchical data structure 15.

In one arrangement, returning to FIG. 3, the mixed reality device 10 includes a network layout manager 140 which is configured to provide the hierarchical data structure 15 from the network hierarchy manager 124 to the mixed reality display 15 as an image. For example, during operation, the network layout manager 140 retrieves information pertaining to nodes 17 and edges 19 of the first level 132-1 of the hierarchical data structure 15 and calls an imaging API from the mixed reality device 10 to form an image from the node 17 and edge 19 information. The network layout manager 140 transmits the image of the first level 132-1 of the hierarchical data structure 15 to the mixed reality display 16, which superimposes the hierarchical data structure image on a real-world 3D environment image, as captured by camera 32. By displaying the first level 132-1 of the hierarchical data structure 15 to the user as a system of nodes 17, with or without edges 19 between the nodes 17, such as illustrated in FIG. 5, the network layout manager 140 provides the hierarchical data structure 15 at the highest level of abstraction at the start of the process.

Figure 5:
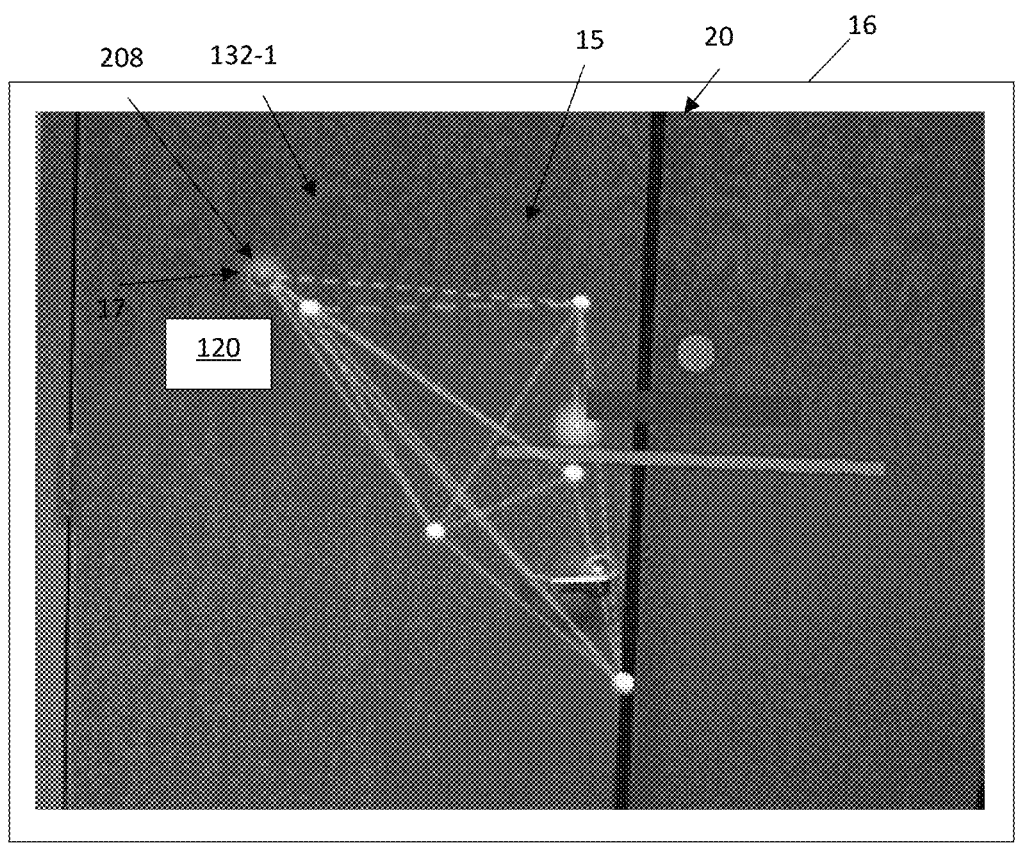
FIG. 5 illustrates a hierarchical data structure as provided by a mixed reality display of the mixed reality device of FIG. 2, according to one arrangement.

As a result, the mixed reality device 10 provides for the visualization of relatively complex network data as a multi-level hierarchical data structure 15 within a real-world 3D environment 20, examples of which are illustrated in FIGS. 2 and 5. This hierarchical representation of the network data provides the user with the ability to efficiently visualize, process, and manipulate the network information. Further, this approach can be broadly applied to a variety of fields with demand for visualization of complex networks. For example, the mixed reality device 10 can be used within the pharmaceutical and biotech industry, with hospitals and medical centers, with networking and logistical systems, and in academic research.

The mixed reality device 10 can display data, such as network data, as a hierarchical data structure 15 that includes clusters 130, mesh elements 284, or a combination of clusters 130 and mesh elements 284. In one arrangement, with reference to FIG. 3, the mixed reality device 10 can switch between the display of a hierarchical data structure 15 as including either clusters 130 or mesh elements 284 in response to receiving a switch command 133. The switch command 133 can be configured as one or more of a gaze input 202, a gesture input 254, and a voice input 256, as will be described in detail below.

For example, assume the case where mixed reality device 10 displays the hierarchical data structure 15 as having clusters 130. To switch the display of the hierarchical data structure 15 to having mesh elements 284, a user can provide the mixed reality device 10 with a switch command 133. In one arrangement, the switch command 133 can include a voice input 256 of the phrase "MESH MODE" along with a second input such as a gesture input 254, such as click gesture on a selected cluster, or a gaze input 202, such as a detected gaze on a particular cluster. In response to receiving the switch command 133, the mixed reality device 10 can display the hierarchical data structure 15 as having mesh elements 284 where the mesh is reconstructed upon the leaf nodes in the hierarchical tree behind the selected cluster 130.

With the hierarchical data structure 15 displayed as a virtual object 18 in a 3D space on the mixed reality display 16, in one arrangement, the mixed reality device 10 provides the user with the ability to interact with the hierarchical data structure 15 to better understand the various aspects of the imaged network. In one arrangement, with reference to FIG. 6, the mixed reality device 10 identifies user interaction with the hierarchical data structure 15 based upon the receipt of object manipulation input 200 from the user. In response to receiving the object manipulation input 200, the mixed reality device 10 can adjust the display of the hierarchical data structure 215 on the mixed reality display 16.

For example, as will be described below, based on the receipt of object manipulation input 200 from the user, the mixed reality device 10 can (1) identify components of the hierarchical data structure 15; (2) provide information regarding components of the hierarchical data structure 15; (3) provide intellectual guidance to the user in the form of hints and navigational information as the user explores the hierarchical data structure 15; (4) return answers to user's questions, search of the objects by some attribute value (name, type, predicate, location), or find longest/shortest path between nodes 17 in the hierarchical data structure 15, for example; (5) manipulate the image of the hierarchical data structure 15 in order to provide a more intuitive spatial representation of the network data; and (6) allow traversal of the hierarchical data structure 15.

In one arrangement, the mixed reality device 10 can be configured to identify components of the hierarchical data structure 15. For example, the mixed reality device 10 can include an active cursor manager 220, which provides a pointer on the mixed reality display 16 which can move about the hierarchical data structure 15 and can highlight particular components of the hierarchical data structure 15 in response to the object manipulation input 200. While the active cursor manager 220 can be responsive to a variety of object manipulation inputs 200, such as voice or gesture, in one arrangement the object manipulation input 200 is configured as gaze input 202 from the user. For example, the gaze input 202 can include head positioning information, such as a position of the user's head 14 relative to the real-world coordinates, or eye position information, such as the position of the user's eyeball relative to the mixed reality display 16. During operation, the gaze input 202 can be implemented as a ray cast from the mixed reality device 10. In the event that the ray cast intersects a component of the hierarchical data structure 15, the active cursor manager 220 can identify that component of the hierarchical data structure 15 on the mixed reality display 16.

Figure 6:
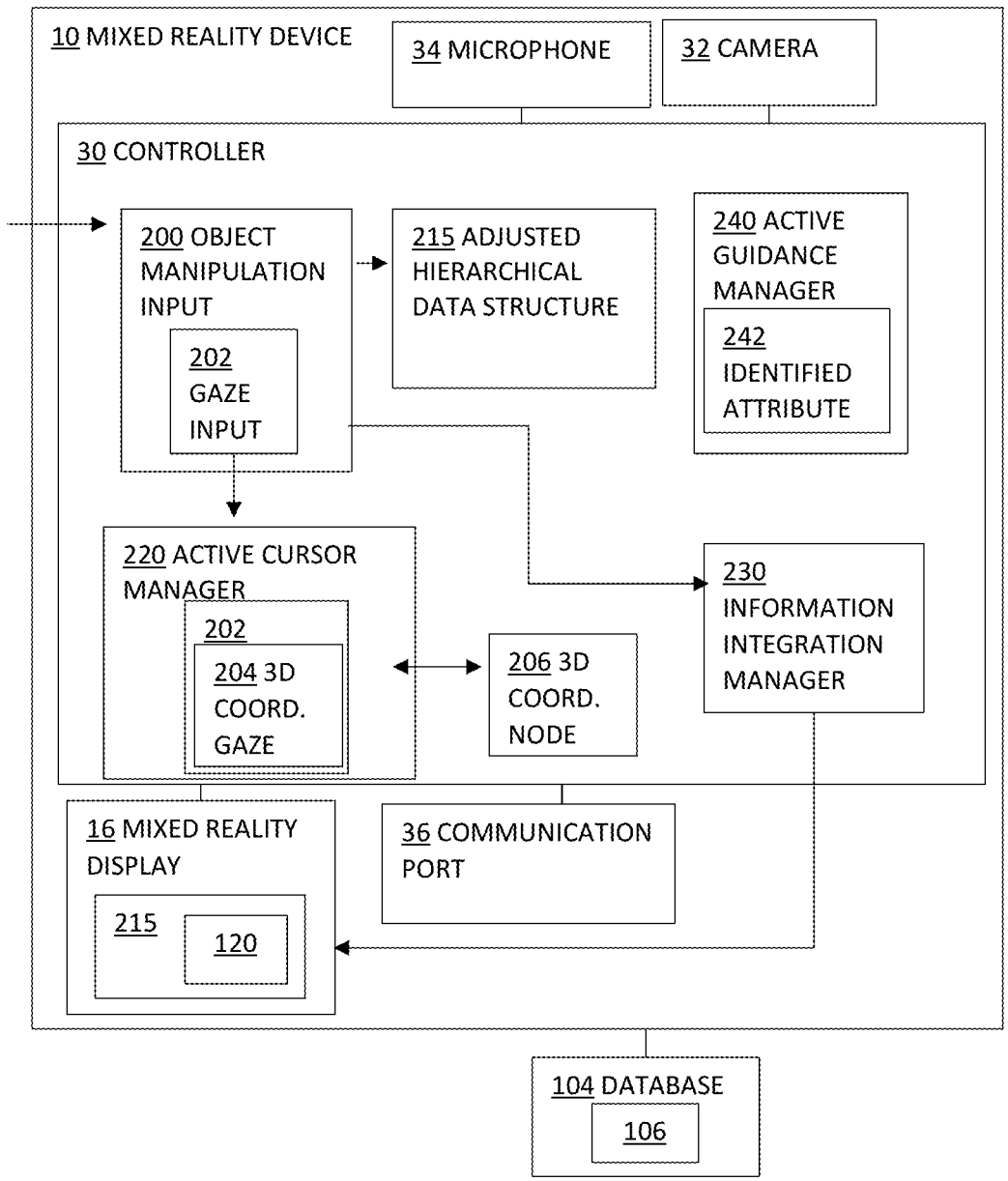
FIG. 6 illustrates a schematic representation of the mixed reality device of FIG. 2, according to one arrangement.

For example, with reference to FIG. 6, during operation, the active cursor manager 220 is configured to receive a gaze input 202 from the user and identify a 3D coordinate 204 associated with the gaze input 202. For example, in the case where the gaze input 202 relates to the position of the user's head, the 3D coordinate 204 relates to the position, in real-world coordinates, of a ray cast from the mixed reality device 10.

Next, the active cursor manager 220 is configured to compare the 3D coordinate 204 associated with the gaze input 202 with a 3D coordinate 206 associated with each node of the subset of nodes. For example, as indicated above, the nodes 17 of the hierarchical data structure 15 include spatial coordinates, as provided by the 3D embedded network data 102, which are bound with a real-world, physical coordinate system as displayed by the mixed reality display 16. Accordingly, the active cursor manager 220 is configured to compare the real-world 3D coordinate 204 associated with the gaze input 202 with the real-world coordinates 206 associated with the nodes 17 of the level of the hierarchical data structure 15 as displayed by the mixed reality display 16.

In the case where the active cursor manager 220 detects a correspondence or overlap between the 3D coordinate 204 associated with the gaze input 202 and the 3D coordinate 206 associated with a node 17 of the hierarchical data structure 15, the active cursor manager 220 is configured to display node identification information 208 associated with that node 17. For example, with reference to FIG. 5, the node identification information 208 can include a highlight around the node 17 of interest. In another example, the identification information 208 can include an interactive help menu display, which appears in the user's view of the mixed reality display 16 and can include the name and/or other characteristics of the node 17.

Returning to FIG. 6, the mixed reality device 10 can be configured to provide information regarding components of the hierarchical data structure 15. For example, the mixed reality device 10 can include an information integration manager 230 which causes the mixed reality display 16 to display additional data or secondary information 120 that is associated with a selected node 17 or region of the network hierarchical data structure 15. Such operation is based upon the receipt of object manipulation input 200 relating to a node 17 of the hierarchical data structure 15.

For example, with reference to FIG. 5, assume the case where the user has highlighted node 17 as a node of interest. The user can further provide a gesture input, such as a hand motion received by the camera 32, as the object manipulation input 200. In response to the object manipulation input 200, the information integration manager 230 causes the mixed reality display 16 to display secondary information 120 relating to the node 17. For example, the secondary information 120 can include knowledge-domain features 122, as provided through the mapped link between the node 17 and the local database (not shown). In another example, the secondary information 120 can include detailed images of the node 17 (e.g., an image of the 3D protein structure represented by the node 17, videos, music, plots, charts, or other 3D objects related to the node 17). In such a case, the information integration manager 230 can retrieve the secondary information 120 from the external database 104.

Returning to FIG. 6, the mixed reality device 10 can be configured to provide intellectual guidance to the user in the form of hints and navigational information as the user explores the hierarchical data structure 15. For example, the mixed reality device 10 can include an active guidance manager 240 which is configured to display an identified attribute 242 regarding one or more nodes 17 in the hierarchical data structure 15. As will be described below, the active guidance manager 240 can be configured to display the identified attributes 242 as either static or dynamic information.

In one arrangement, the active guidance manager 240 is configured to display the identified attribute 242 as static information associated with particular nodes 17 in the hierarchical data structure 15 when a user is engaged with that hierarchical data structure 15. For example, with reference to FIG. 7, assume the case where the hierarchical data structure 15 represents a molecular network and the active guidance manager 240 is configured to provide, as the identified attribute 242, an indication of proteins which include mutations. In such a case, as the user views the layer of the hierarchical data structure 15 through the mixed reality display 16 the active guidance manager 240 identifies particular nodes 17 as having a mutation as the identified attribute 242. For example, as shown, the active guidance manager 240 is configured to display nodes 17 having mutations associated with protein binding with a first identified attribute 242-1 and nodes 17 having mutations associated with phosphorylation with a second identified attribute 242-2.

Figure 7:
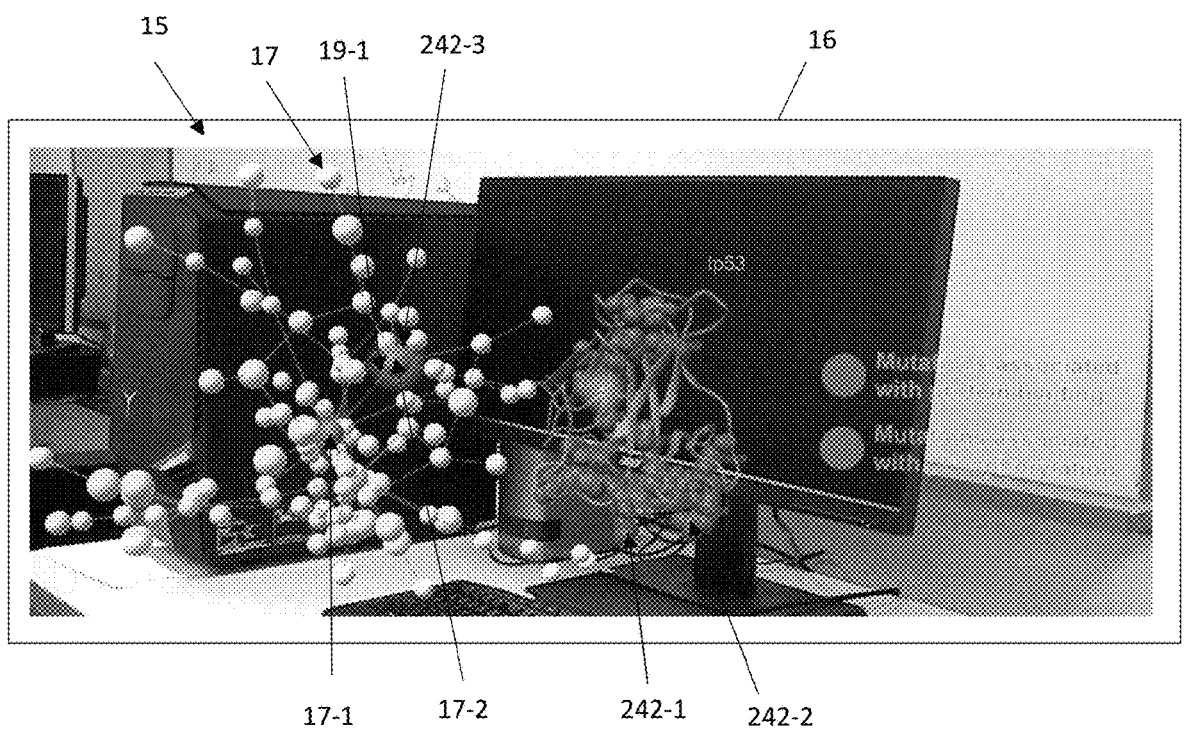
FIG. 7 illustrates a layer of a hierarchical data structure as provided by a mixed reality display of the mixed reality device of FIG. 2, according to one arrangement.

Returning to FIG. 6, in one arrangement, the active guidance manager 240 is configured to display the identified attribute 242 as dynamic information associated with a secondary node 17 in the hierarchical data structure 15 in response to receiving the object manipulation input 200 relative to a related, primary node from the user, such as in conjunction with the active cursor manager 220. For example, assume the case where the active guidance manager 240 is configured to provide, as an identified attribute 242, an indication of nodes which are connected to a selected, or primary, node by an edge 19. With reference to FIG. 7, further assume that the user has identified node 17-1 as a primary node or node of interest, such as through the use of the active cursor manager 220. For example, the mixed reality device 10 can be configured to receive gaze input 202 via the active cursor manager 220. When the active cursor manager 220 identifies a particular node 17-1 as a node of interest, the active guidance manager 240 can receive such identification an object manipulation input 200. In response to receiving such identification as object manipulation input 200, the active guidance manager 240 is configured to identify secondary node 17-2 as having an attribute related to the primary node 17-1 (i.e., such as by a connection via edge 19-1). In one arrangement, the active guidance manager 240 is configured to provide, as the identified attribute 242-3, a halo around the secondary node 17-2. Further, in response to receiving the object manipulation input 200, the active guidance manager 240 can provide, as dynamic information, the name of the identified node 17-1. In one arrangement, the active guidance manager 240 is configured to switch between different features of the nodes 17 to be dynamically indicated, based upon input from a manipulation manager 250, as described below.

Figure 8:
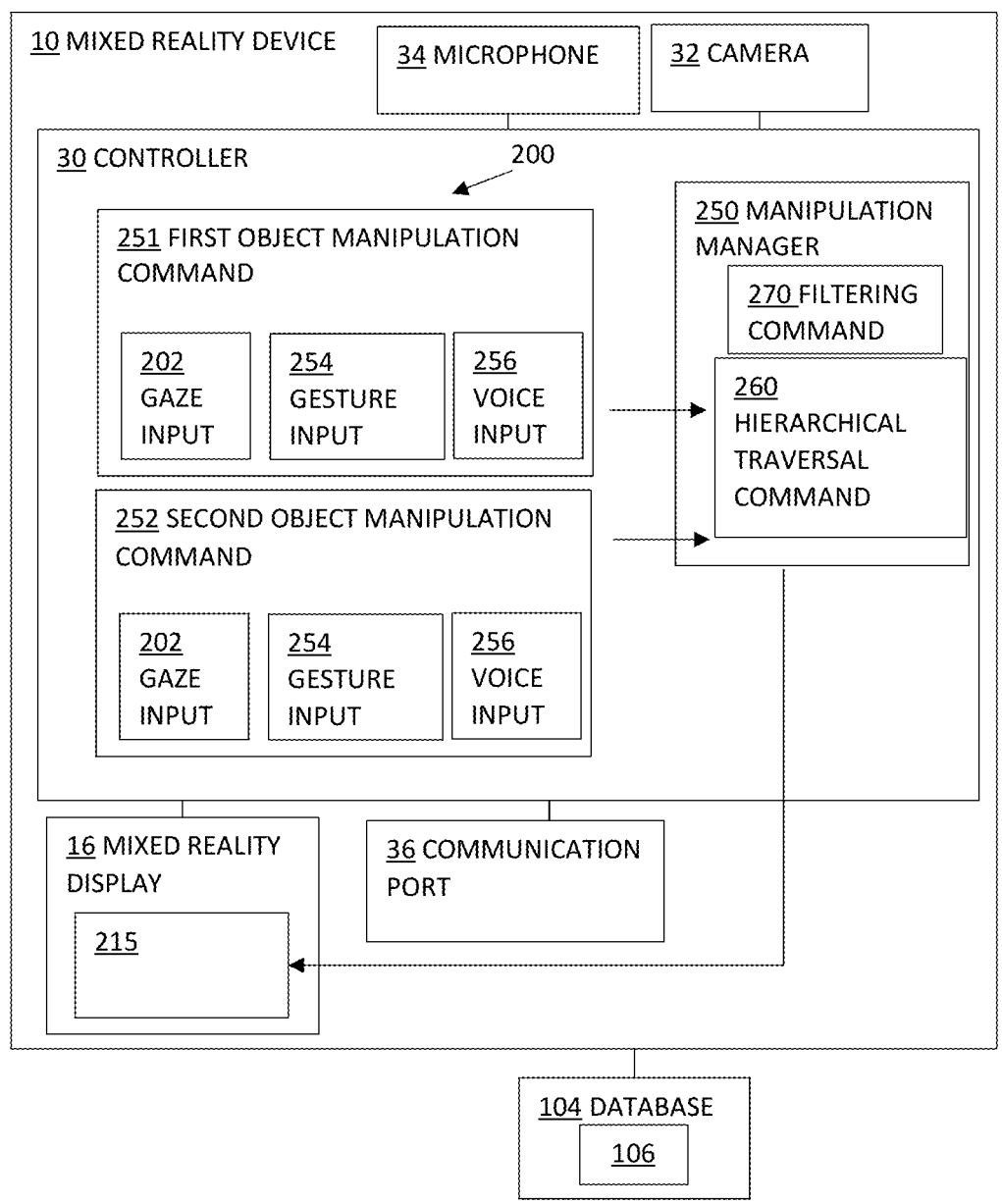
FIG. 8 illustrates a schematic representation of a manipulation manager of the mixed reality device of FIG. 2, according to one arrangement.

With reference to FIG. 8, the mixed reality device 10 can be configured to allow user-manipulation of the image of the hierarchical data structure 15 in order to provide the user with a more intuitive spatial representation of the network data. For example, the mixed reality device 10 can include a manipulation manager 250 which is configured to provide the user with the ability to interact with the hierarchical data structure 15.

In one arrangement, the manipulation manager 250 is responsive to a combination of user-actions as object manipulation input 200. User-actions can be combined in a variety of ways such that each combination can result in a different manipulation or interaction with the virtual object 18. Accordingly, with such a configuration, the mixed reality device 10 allows the user to interact with the virtual object 18 in a relatively robust manner. For example, during operation, the manipulation manager 250 can receive, as the object manipulation input 200, a first object manipulation command 251 and a second object manipulation command 252 from the user to adjust the display of the hierarchical data structure 215 on the mixed reality display 16. For example, the mixed reality device 10 can be configured to receive gaze input 202 via the active cursor manager 220, gesture input 254 via the camera 32, and voice input 256 via the microphone 34. Accordingly, to allow user manipulation of the hierarchical data structure 15, the manipulation manager 250 can receive, as the first object manipulation command 251, one of a gaze input 202, gesture input 254, or voice input 256 from the user and can receive, as the second object manipulation command 252, one of a gaze input 202, gesture input 254, or voice input 256 from the user provided the second object manipulation command 252 is different from the first object manipulation command 251.

The manipulation manager 250 can be configured to provide a variety of adjustments to the display of the hierarchical data structure 215 based upon the user's object manipulation commands 251, 252. The following provides several example configurations of the manipulation manager 250 in response to corresponding example commands. It is noted that the combination of object manipulation commands 251, 252 and resulting manipulation or interaction with the virtual object 18 are presented by way of example only.

In one arrangement, the manipulation manager 250 is configured to dynamically adjust the display of the hierarchical data structure 215 based upon the combination of a gesture input 254 and a voice input 256. Table 1 provides several example types of dynamic adjustments that can be made to the display of the hierarchical data structure 215 based upon the corresponding gesture input 254 and voice input 256.

TABLE 1

Spatial manipulation based on a combination of voice and gesture inputs.

| DYNAMIC ADJUSTMENT | FUNCTION |
| --- | --- |
| Moving | Changes the position of the hierarchical data structure 215 in environment following a corresponding voice command as the voice input 256 and following a drag/drop gesture as the gesture input 254. |
| Rotating | Rotates the hierarchical data structure 215 around its spatial center in horizontal and/or vertical plains by calling corresponding voice command and following drag/drop gesture. |
| Scaling | Scales the size of hierarchical data structure 215 following a corresponding voice command as the voice input 256 and following a drag/drop gesture as the gesture input 254. |
| Center | Sets the position of hierarchical data structure 215 in front of the user's gaze direction following a corresponding voice command as the voice input 256. |
| Moving node | Relocates the position of a chosen node of the hierarchical data structure 215 relative to other elements of the hierarchical data structure 215 following a corresponding voice command as the voice input 256 and following drag/drop gesture as the gesture input 254. |
| Shrink | Sets the density of a group of nodes (e.g., cluster/leaf node/mesh) of a hierarchical data structure 215 as either more or less dense while maintaining both the size of each node with the changing distance and a ratio of the distances among the nodes. This can be done in response to a voice command as the voice input 256 and following a drag/drop gesture as the gesture input 254. By keeping size of the nodes constant, the user can identify a relatively increased number of details of a dataset under investigation. |

In the case where the gesture input 254 is a drag/drop gesture, the manipulation manager 250 of the mixed reality device 10 can identify the user as bringing his index finger and thumb together to a closed position (e.g., a click motion) and shifting the hand position of the closed index finger and thumb relative to the display of the hierarchical data structure 215 (e.g. a drag motion). In one arrangement, the mixed reality device 10 can apply a time threshold to the hand motion to identify the presence of a click/wait gesture. For example, if a time associated with the placement of the user's hand at a substantially constant position in space following the drag motion is greater than the time threshold, such as a duration of one second, the mixed reality device 10 can identify the gesture as a click/wait gesture. With a click/wait gesture, the mixed reality device 10 identifies a subsequent hand gesture as being considered a new gesture, rather than a continuation of a previously detected gesture.

In one arrangement, the manipulation manager 250 is configured to display interactive help (e.g., returning answers to user's questions, searching of the nodes 17 by some attribute value (name, type, predicate, location), or finding the longest/shortest path between nodes 17 in the hierarchical data structure 15, for example) relative to the hierarchical data structure 215 based upon the combination of a gaze input 202 and a voice input 256. Table 2 provides several examples of interactive help that can be provided relative to the display of the hierarchical data structure 215 based upon the corresponding gaze input 202 and the voice input 256.

TABLE 2

Interactive help displayed based on a combination of voice and gaze inputs.

| INTERACTIVE HELP | FUNCTION |
| --- | --- |
| Search of the node by name | Recognition and highlighting a node by its name, following a corresponding voice command as the voice input 256. |
| Navigation | Flashes map of a present location in the hierarchical tree of the visualized hierarchical data structure 215 following a corresponding voice command as the voice input 256. |
| Voice commands | Flashes the name of the voice command that was recognized as the voice input 356. |
| Commands manual | Flashes a list of the voice commands and a manual on their usage following a corresponding voice command as the voice input 256. |
| History | Returns the network to previous spatial state following a corresponding voice command as the voice input 256. After every spatial manipulation, when the hierarchical data structure 215 changes its location, angle, or scale, the previous stage is written in memory. Previous stages can be accessed in response to a corresponding voice command as the voice input 256. |

In one arrangement, when executing a Navigation function, the mixed reality device 10 can display a flashing image of an element in a hierarchical data structure 215 that shows how deeply into hierarchy the user has ventured. The flashing image can include a mode name (e.g., normal, standby, linkage, 2D mode) relating to the mode of the display.

In one arrangement, Navigation can be provided both dynamically and statically. With dynamic Navigation, during operation the mixed reality device 10 can flash a map of a present location in the hierarchical tree of the visualized hierarchical data structure 215 which can then fade away over time. With static Navigation, during operation the mixed reality device 10 can flash a map of a present location in the hierarchical tree of the visualized hierarchical data structure 215 which can then remain visible for an extended period of time (e.g., permanently). Also with static Navigation, all relevant changes to the displayed hierarchical data structure 215, are displayed by the mixed reality device 10 on the navigation image.

In one arrangement, the manipulation manager 250 is configured to allow user traversal of the hierarchical data structure 15, whether displayed with clusters 130, mesh elements 284, or a combination of clusters 130 and mesh elements 284, based upon the combination of a gesture input 254 and a voice input 256 as a hierarchy traversal command 260. Table 3 provides several example types of dynamic adjustments that can be made to the display of the hierarchical data structure 215 based upon the corresponding gesture input 254 and voice input 256.

TABLE 3

Traversal of the hierarchical data structure based on a combination of gaze, gesture and voice inputs

| TRAVERSAL | FUNCTION |
| --- | --- |
| Return to root | Returns to the root position in the hierarchical data structure 215 by a corresponding voice command as the voice input 256. |
| Level down | Traverses lower in the hierarchical data structure 215 on a less abstract layer by a corresponding click gesture as the gesture input 254 on a selected cluster node. |
| Level up | Traverses higher in the hierarchical data structure 215 on a more abstract layer by a corresponding voice command as the voice input 256. |

Figure 9A:
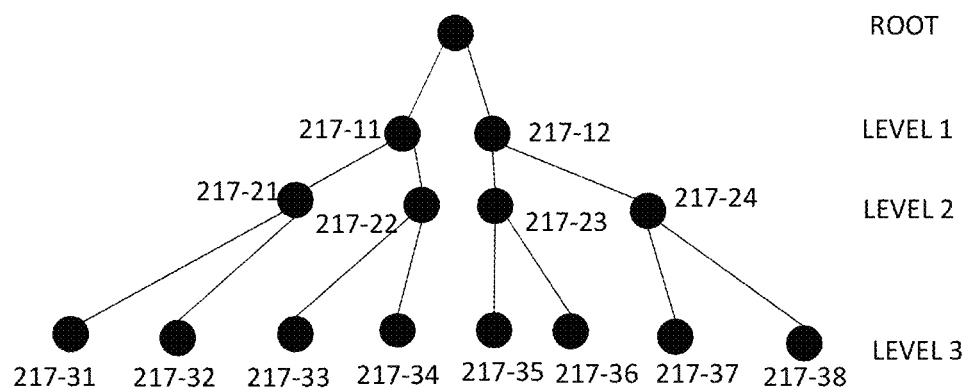
FIG. 9A illustrates a tree structure of a set of network data which shows the hierarchy of the data, according to one arrangement.

During operation, in response to receiving the hierarchy traversal command 260, the manipulation manager 250 is configured to adjust the display of a particular level of a hierarchical data structure 15 as part of a branch-based traversal of the structure 15. For example, FIG. 9A presents a tree structure of a set of network data which shows the hierarchy of the data (i.e., how the nodes are aggregated with each other for better representation of data). As shown, each node in the hierarchy has one parent from a higher level (e.g., and can include more than one parent for more sophisticated cases) and a children from a lower level. Accordingly, taking node 217-21 as an example cluster node, node 217-21 has leaf nodes 217-31 and 217-32 as children and cluster node 217-11 as a parent. Informational link 134 represents these relations among the nodes.

Figure 9B:
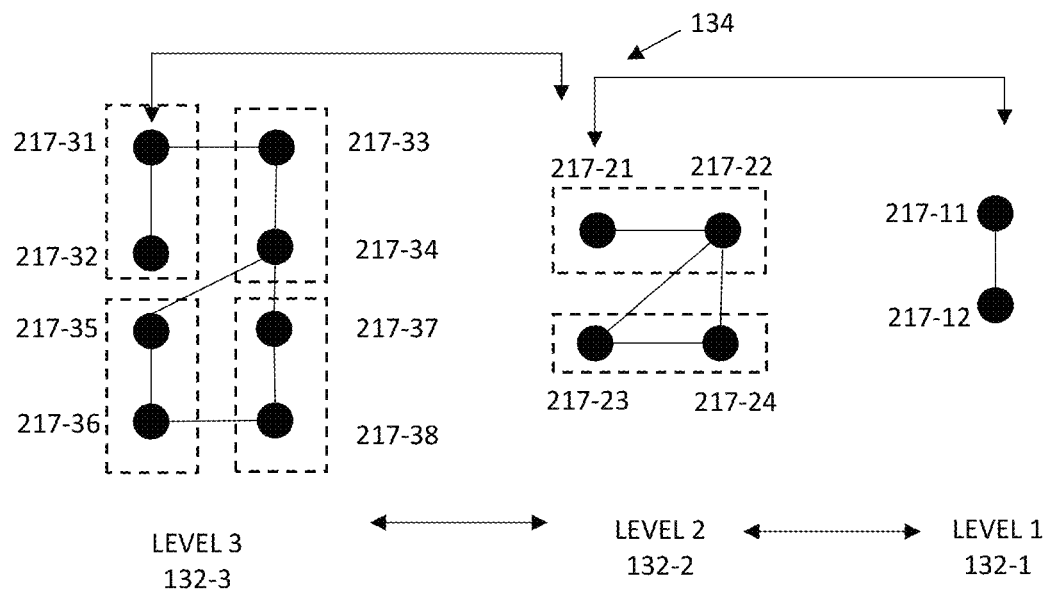
FIG. 9B illustrates aggregation of the nodes of FIG. 9A in accordance with hierarchical structuring, according to one arrangement.

FIG. 9B illustrates aggregation of the nodes 217 in accordance with hierarchical structuring. For example, the network data is aggregated hierarchically as Level 3 132-3, then Level 2 132-2 and Level 1 132-1. As a user traverses such a network using the hierarchy traversal command 260, the mixed reality device 10 is configured to display the information provided within the dash structures.

During operation, the mixed reality device 10 provides Level 1 132-1 as part of the mixed reality display 16 and can receive a hierarchy traversal command 260 relative to at least one node of a first level of the hierarchical data structure 15. Assume the manipulation manager 250 has received a hierarchy traversal command 260 to adjust the display of the hierarchical data structure 15 from Level 1 132-1 to Level 2 132-2. For example, the user can use a gesture input to click on the node 217-11. As a result, such a hierarchy traversal command 260 causes the manipulation manager 250 to call a network construction function (NET_CONSTRUCT) the node 217-11 as an input (e.g., NET_CONSTRUCT (217-11)). In response to receiving the hierarchy traversal command 260, the manipulation manager 250 is configured to identify the information link 134 between the first level 132-1 and the second level 132-2 of the hierarchical data structure 15. The information link 134 can be stored in either a local or external database 104. Based upon the information link 134, the manipulation manager 250 can identify the nodes 217-21 and 217-22 associated with the second level hierarchical data structure 15 (e.g., as stored by the network hierarchy manager 124).

Following such identification, the mixed reality device 10 can display the node of the second level 217-21 and 217-22 of the hierarchical data structure 15 on the mixed reality display based upon the information link 134 between the first level the second level of the hierarchical data structure 15. For example, the mixed reality device 10 can display nodes 217-21 and 217-22 as the second level 132-2 of the hierarchical data structure 15 on the mixed reality display 16. Here, the manipulation manager 250 provides traversal from a coarser-grain to a finer-grain view of the hierarchical data structure 15.

In one arrangement, the manipulation manager 250 is configured to provide traversal from a finer-grain to a coarser-grain view of a hierarchical data structure 15. For example, assume the case where the mixed reality device 10 provides nodes 217-31 and 217-32 of Level 3 132-3 as part of the mixed reality display 16. This is a result of the manipulation manager 250 having previously called a network construction function (e.g., NET_CONSTRUCT) with node 217-21 as an input (e.g., NET_CONSTRUCT (217-21)). In the case where the user wants to return to Level 2 132-2 to view nodes 217-21 and 217-22, the manipulation manager 250 knows only that the parent of nodes 217-31 and 217-32 is node 217-21, but, at the same time, can identify the parent of node 217-21, which is node 217-11. Using informational links 134 between the levels to go a level up, the manipulation manager 250 can identify the parent (node 217-11) of the parent (node 217-21) of node 217-31. Accordingly, when on a finer grain node, the manipulation manager 250 is configured to identify the parent node of a parent node.

While FIG. 9B illustrates the branch-based traversal of the hierarchical data structure 15, it should be understood that a mesh-based representation of a hierarchical data structure 15 can be traversed in a similar manner. In this case, clusters would be represented as a closed mesh as opposed to a standard shape.

During branch-based traversal of a hierarchical data structure 15, the mixed reality device 10 is configured to display nodes (e.g., clusters or meshes) associated with a particular level of the hierarchical data structure 15 based upon the information link 134 between the first level and the second level. As such, during branch-based traversal the mixed reality device 10 typically does not display the Root of the hierarchical data structure 15, as shown in FIG. 9B. Further, the mixed reality device 10 only displays the nodes of the second level hierarchical data structure 15 which are related to a selected node of a preceding level (e.g., a node that is under investigation), as identified by the information link 134. In certain cases, it can be beneficial for a user to view all nodes associated with a particular level, including the Root. As such, the mixed reality device 10 is configured to provide global-based traversal of the hierarchical data structure 15.

Figure 9C:
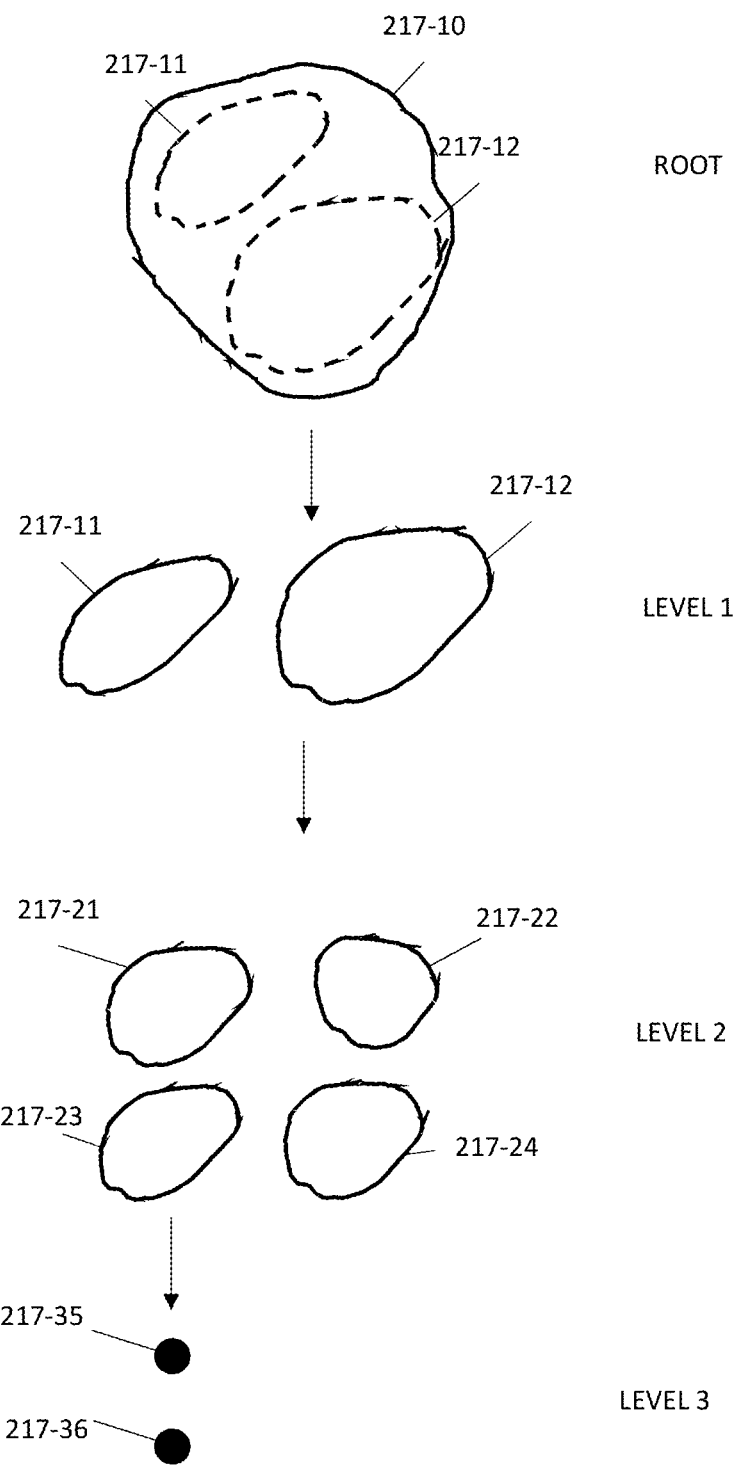
FIG. 9C illustrates traversal of the hierarchical data structure of FIG. 9A according to global-based traversal, according to one arrangement.

For example, with reference to FIG. 9C, the mixed reality device 10 can display the Root level of a hierarchical data structure 15 as a mesh element 217-10 where the mixed reality device 10 has constructed the Root mesh element by tessellation of (e.g., application of the mesh function 127 to) the leaf nodes 217-31 through 217-38 shown in FIG. 9A. In response to receiving a hierarchy traversal command 260 to adjust the display of the hierarchical data structure 15 from the Root to Level 1 (e.g., such as the voice command "LEVEL DOWN"), the mixed reality device 10 displays mesh elements 217-11 and 217-12. The mixed reality device 10 can construct these mesh elements 217-11 and 217-12 by tessellation of (e.g., application of the mesh function 127 to) the leaf nodes 217-31 through 217-34 and leaf nodes 217-35 through 217-38, respectively. As such, the mixed reality device 10 displays all nodes of the second level of the hierarchical data structure 15, that is, mesh elements 217-11 and 217-12 for all of the clusters on Level 1. As such, the mixed reality device 10 can provide a representation of a complete dataset structure, as opposed to the display of the clusters 130 of a particular branch as described above.

In response to receiving a hierarchy traversal command 260 to adjust the display of the hierarchical data structure 15 from Level 1 to Level 2, the mixed reality device 10 displays mesh elements 217-21 through 217-24. The mixed reality device 10 can construct these mesh elements 217-21 through 217-24 by tessellation of (e.g., application of the mesh function 127 to) the leaf nodes behind the clusters represented in each of the mesh elements 217-21 through 217-24. If the next level down (Level 3) in the hierarchical data structure 15 is a leaf level, in response to the receipt of a hierarchy traversal command 260 for a cluster of interest, such as cluster 217-23, the mixed reality device 10 is configured to display the leaves associated with that cluster 217-23, namely leaves 217-35 and 217-36.

The mixed reality device 10 is also configured to adjust the display of the hierarchical data structure 15 from a lower level to an upper level. For example, in response to a hierarchy traversal command 260, such as the voice command "LEVEL UP", the mixed reality device 10 can adjust the display of the hierarchical data structure 15 from a lower level, such as Level 2, to an upper level, such as Level 1.

While FIG. 9C illustrates the global traversal of a mesh-based representation of a hierarchical data structure 15, it should be understood that a branch-based representation of the hierarchical data structure 15 can be traversed in a similar, global manner. Further, it is noted that the mixed reality device 10 can switch between the branch-based traversal and the global-based traversal in response to a traversal command. For example, the traversal command can be configured as a voice command, such as "GLOBAL TRAVERSAL" for global traversal and "BRANCH TRAVERSAL" for branch traversal.

In one arrangement, with reference to FIG. 9C, when providing the traversal of a mesh-based representation of a hierarchical data structure 15, the mixed reality device 10 is configured to display and indication of two or more layers of the hierarchical data structure 15 at the same time. For example, as indicated at the Root level, the mixed reality device 10 displays the root mesh element 217-10 and provides a representation of the meshes 217-11 and 217-12 present in the next level deeper, Level 1, in the hierarchical data structure 15. In one embodiment, the mixed reality device 10 can display the root mesh element 217-10 as semi-transparent, thereby allowing the user to visualize the meshes 217-11 and 217-12 in the level below. Further, the mixed reality device 10 can display the meshes 217-11 and 217-12 as semi-transparent as well, to provide an indication of the presence of meshes 217-21 through 217-24 in the level below.

As indicated above, a user can traverse the hierarchical data structure 15 using either a branch-based traversal approach or a global-based traversal approach. Such traversal allows vertical level-up or level-down exploration of the hierarchical data structure 15. In one arrangement, the mixed reality device 10 is configured to allow lateral traversal of the hierarchical data structure 15. For example, with reference to FIG. 3, in response to receiving a linkage command 135 relative to a selected node 17 of a hierarchical data structure 15, the mixed reality device 10 can apply a linkage feature 137 to the selected node 17 identify linked nodes (e.g., cluster/leaf node/mesh) having a neighboring relationship to the selected node, such as provided by a network layout. Following this identification, the mixed reality device 10 can display at least one of the selected node 17 and the linked node. With such a configuration, the mixed reality device 10 allows the user to explore beyond a given branch or beyond a set of visible clusters/leaf nodes/meshes to other linked branches in the hierarchical data structure 15. Further, mixed reality device 10 can display all neighbors of a node 17 (e.g., cluster/leaf node/mesh) of interest, even if the neighbors are not represented in the hierarchical data structure 15 or is invisible due to filtration.

Figure 14:
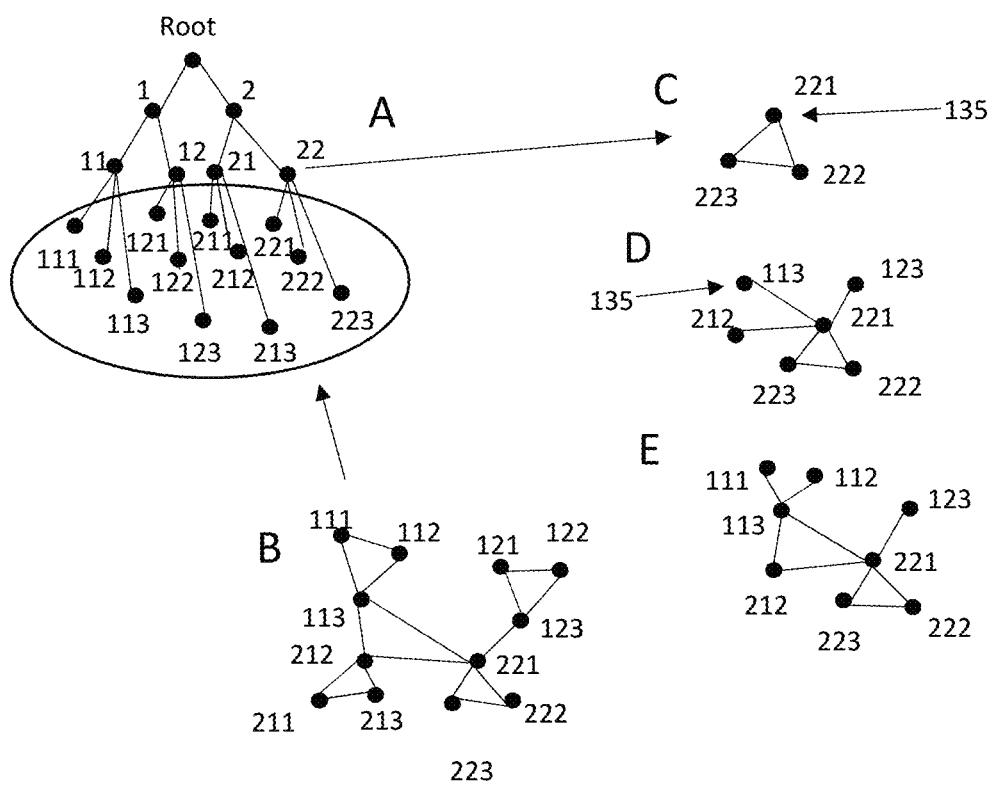
FIG. 14 illustrates an example of traversal of a hierarchical data structure using a linkage command, according to one arrangement.

In one arrangement, FIG. 14 illustrates the case where the hierarchical data structure 15 is provided (FIG. 14A) where the leaf nodes 417 represent a network having a particular organization (FIG. 14B). During operation, in the case where a user generates a linkage command 135 by selecting a node of interest, if there is an edge between the selected node and a neighbor node in the network, the mixed reality device 10 can apply a linkage feature 137 to the selected node. As a result, the mixed reality device 10 can identify and display the neighbor node and linking edge, even if the selected node and neighbor node are located in different clusters.

For example, assume the user generates a linkage command 135 relative to cluster 22. As indicated in FIG. 14C, the mixed reality device 10 can apply a linkage feature 137 to the cluster 22 to identify and display the neighbor nodes 221, 222 and 223 (i.e., leaf nodes) related to cluster 22. In the case where the user generates a linkage command 135 relative to node 221, the mixed reality device 10 can apply a linkage feature 137 to the node 221 to identify and leaf nodes 112 and 212, as shown in FIG. 14D. Neither leaf node 112 and 212 is included in cluster 22, however, because the network layout identifies edges between nodes 221 and 112 as well as nodes 221 and 212, the mixed reality device 10 can identify these leaf nodes as neighbors to node 221. In the case where the user generates another linkage command 135 relative to node 113, the mixed reality device 10 can apply a linkage feature 137 to the node 113 and depict additional neighboring nodes and edges, as shown in FIG. 14E.

Figure 15:
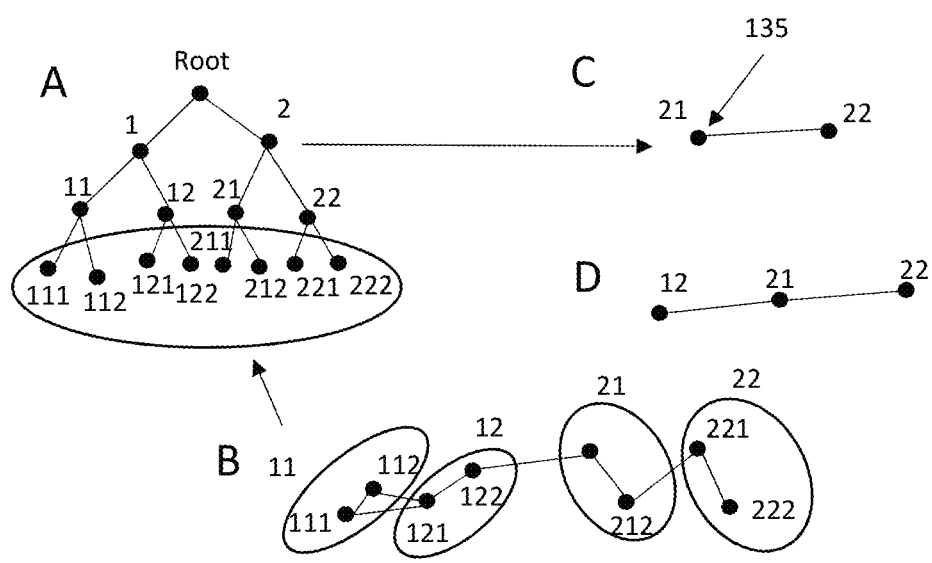
FIG. 15 illustrates an example of traversal of a hierarchical data structure using a linkage command, according to one arrangement.

In the example of FIG. 14, the user can reconstruct an entire network from the bottom or leaf layer of a hierarchical data structure 15. In one arrangement, the user can also explore and/or reconstruct a network in the middle of a hierarchical tree. FIG. 15 provides an example of such a case.

For example, assume the user generates a linkage command 135 relative to cluster 2 (FIG. 15A). The mixed reality device 10 can apply a linkage feature 137 to the cluster 2 to identify clusters 21 and 22, which are on a lower level of hierarchy and more detailed, and display the clusters 21 and 22 as shown in FIG. 15C. Further assume the user generates a linkage command 135 relative to cluster 21. In the original network shown in FIG. 15B, there is an edge between node 221 and node 122, which are behind clusters 21 and 12 respectively. Accordingly, this is a minimally sufficient condition for the mixed reality device 10 to change the layout to that shown on FIG. 15D, where cluster 12 appears. Accordingly, if mixed reality device 10 can apply a linkage feature 137 to cluster of interest A, then the mixed reality device 10 displays new cluster B in the layout if and only if there is at least one edge in the original network between any leaf node(s) of A and any of leaf node(s) of B. In one arrangement, a threshold may be used as a criterion of drawing edge to neighbor cluster.

As provided above, the linkage command 135 can be applied to identify linkages to both leaf nodes and clusters. As a result, mixed reality device 10 can display the presence of edges between leaf nodes or leaf nodes behind different clusters. In one arrangement, the linkage command 135 can take additional conditions into consideration. For example, the linkage command 135 can request an identification of both (1) the neighbor nodes of a selected node/mesh/cluster that share the same edge in the original network and (2) edges having a particular set of attributes (e.g., edges having a length greater than L, a weight less that M, having only a green color, etc.). Accordingly the linkage command 135 can be configured to operating and identify particular edge features.

In one arrangement, the manipulation manager 250 is configured to dynamically adjust the display of the hierarchical data structure 215 to show different modes associated with the hierarchical data structure 215 based upon a voice input 256. For example, the mixed reality device 10 can be configured to display a hierarchical data structure 15 in one of three spatial resolution modes: normal, standby, and skeleton. In normal mode, the mixed reality device 10 allows all manipulations to be applied to the hierarchical data structure 15. In standby mode, the mixed reality device 10 prohibits all manipulations to be applied to the hierarchical data structure 15. In one arrangement, the mixed reality device 10 is set to standby mode, by default and is switched to normal or skeleton mode for further manipulations. In skeleton mode, the mixed reality device 10 displays only the edges 19 of the hierarchical data structure 15. Table 4 provides examples of the modes that can be provided by the manipulation manager 250 in response to the corresponding commands.

TABLE 4

Display of spatial resolution modes of the hierarchical data structure based on a voice input

| MODE | FUNCTION |
| --- | --- |
| Normal mode | Sets the mode of the hierarchical data structure 215 when all the manipulations can be performed and all elements of the hierarchical data structure 215 are visible and the hierarchical data structure 215 has a fixed position. Normal mode is engaged following a corresponding voice command as the voice input 256. |
| Skeleton mode | Sets the mode of the hierarchical data structure 215when only edges are observed and other features of the mode are the same as normal mode provides. Skeleton mode is engaged following a corresponding voice command as the voice input 256. |
| Standby mode | Sets the mode of the hierarchical data structure 215 when no manipulations and transformations can be done. Standby mode is engaged following a corresponding voice command as the voice input 256. |

In one arrangement, the manipulation manager 250 is configured to show informational modes associated with the hierarchical data structure 215. As provided above, the active guidance manager 240 is configured to display identified attributes 242 of particular nodes 17 in the hierarchical data structure 15 as static information. For example, assume the case where the mixed reality device 10 displays cancer associated proteins or nodes 17 in the virtual object 18 as having a red halo and diabetic associated proteins as having a green halo. However, assume the user wants to see the tissue type where the genes of the corresponding proteins are expressed, but not the diseases. In such a case, the manipulation manager 250 is configured to switch the informational mode associated with the hierarchical data structure 215, such as by using a voice command as the voice input 256. In response to the voice input 256, the proteins or nodes 17 whose gene are expressed in a first tissue type, such as kidney tissue, can be highlighted in a first manner and the proteins or nodes 17 whose gene are expressed in a second tissue type, such as liver, can be highlighted in a second manner.

In one arrangement, the mixed reality device 10 can provide filtering of aspects of the display of the hierarchical data structure 215 which allows a user to extract particular clusters/leaf nodes/meshes associated with a hierarchical data structure 215. For example, with reference to FIG. 8, the manipulation manager 250 of the mixed reality device 10 can be configured to provide manipulation, rearrangement, and/or a change of layout (i.e., filtering) of the displayed hierarchical data structure 215 based upon a filtering command 270. The filtering command 270 can include any object manipulation command such as gaze input 202, gesture input 254, and voice input 256, taken individually or in some combination. The results of the filtering provided by the manipulation manager 250 can depend upon the features or values of observed clusters/leaf nodes/meshes displayed with the hierarchical data structure 215.

During operation, in response to receiving the filtering command 270, the manipulation manager 250 can provide a variety of types of adjustment of the display of at least a portion of the hierarchical data structure 215. For example, in response to the filtering command 270, the manipulation manager 250 can provide a static (e.g., one-time) adjustment of the display of at least a portion of the hierarchical data structure 215 by adjusting one or more options of one or more of the nodes 17 and/or edges 19, such as the color, shape, scale, spatial position, visibility (e.g., from visible to invisible), and/or level of transparency. In another example, in response to the filtering command 270, the manipulation manager 250 can provide a dynamic change of the display of at least a portion of the hierarchical data structure 215 by adjusting one or more options of one or more of the nodes 17 and/or edges 19, such as the color, shape, scale, spatial position, visibility, and/or level of transparency. In one arrangement, the dynamic change occurs gradually over time between two values. For example, when changing the color of a node, the manipulation manager 250 can begin the change at a first time with the node set at a default color and increase the color value over a time duration to a second time, such as a color value that is 100 points higher than the default value.

In one arrangement, in response to the filtering command 270, the manipulation manager 250 can provide a light effect to the nodes 17 and/or edges 19 of the hierarchical data structure 215. For example, the manipulation manager 250 can provide static or dynamic light effects to the elements of the hierarchical data structure 215, such as by displaying a halo about one or more of the nodes. Such a light effect allows the user to visually identify particular nodes of interest within the hierarchical data structure 215, such as for further investigation.

In one arrangement, in response to the filtering command 270, the manipulation manager 250 can perform an updated clustering or meshing process on a respective cluster or mesh, based upon an updated feature or metric associated with the node or mesh. For example, assume each node 17 of a hierarchical data structure 15 has two features (i.e., secondary information elements 120): f1 and f2 where feature f1 is more important for a study. As such, the mixed reality device 10 can construct the hierarchical data structure 15 based on the Euclidian distance of f1 for the dataset. Further assume that the user works with the hierarchical data structure 15 and, for a particular cluster 130, wishes to review the hierarchical data structure 15 (embedding) if feature f2 were used. In response to receiving a filtering command 270, the mixed reality device 10 can construct the hierarchical data structure 15 (embedding) based on the Euclidian distance of f2 for the dataset. As such, the mixed reality device 10 rearranges the nodes 17 (e.g., their spatial distribution) in the hierarchical data structure 15 based upon the f2 values.

In one arrangement, the manipulation manager 250 provides filtration not only as a logical condition, but as a combination of several conditions implemented within filtering command 270. Accordingly, the manipulation manager 250 can adjust any of the above options or their combination to visualize data points, to fulfill the filtering command 270.

Figure 16:
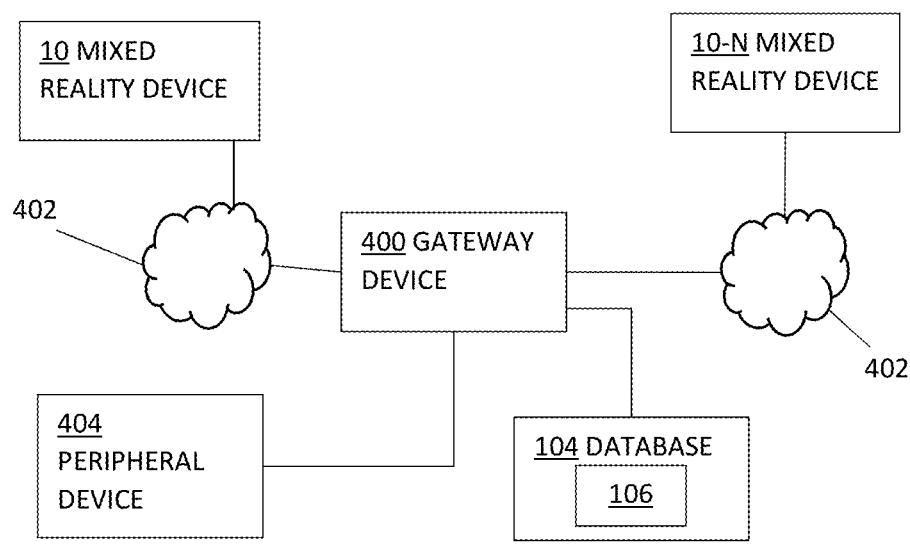
FIG. 16 illustrates a schematic representation of a mixed reality device disposed in electrical communication with a gateway device, according to one arrangement.

As indicated above, the mixed reality device 10 can operate as a stand-alone device in the absence of a network connection. In one arrangement, the mixed reality device 10 can operate as a dynamic device and can interact with other mixed reality devices 10-N. For example, with reference to FIG. 16, the mixed reality device 10 can be disposed in electrical communication with a gateway device 400 via a network 402, such as a local area network (LAN) or wide area network (WAN). The gateway device 400 is configured to exchange communications between the mixed reality device 10 and any other mixed reality devices 10-N disposed in electrical communication with the gateway device 400. As such, a hierarchical data structure 15 and associated traversals or manipulations originating and displayed by the mixed reality device 10 can also be displayed on the other mixed reality devices 10-N. Further, traversals or manipulations of the hierarchical data structure 15 originating from the other mixed reality devices 10-N can be displayed by the mixed reality device 10. Such a configuration allows collaboration among users, such as those at geographically remote locations.

As provided above, the mixed reality device 10 is configured to receive commands related to the display or manipulation of a hierarchical data structure 15 based upon gaze, gesture, or voice. In one arrangement, in the case where the mixed reality device 10 can be disposed in electrical communication with a gateway device 400, the mixed reality device 10 can be configured to receive commands, the exchange of which can occur through a custom protocol, via a peripheral device 404, such as a keyboard or mouse. During operation, a user can input a command, such as an object manipulation input 200, into the peripheral device 404. The gateway device 400 can receive the command from the peripheral device 404 and can deliver the command to the mixed reality device 10, such as via network 402.

As provided above, the mixed reality device 10 is configured to execute graphical user interface (GUI), manipulation, traversal, analytic, and filtering commands. In one arrangement, the gateway device 400 can be configured to execute GUI, console interface, manipulation, traversal, analytic, and filtering commands in addition to the mixed reality device 10.

As provided above, each of the nodes 17 of a hierarchical data structure 15 can include both node attribute and node feature information. However, it can be difficult to allow a comparison of various attributes or features associated with a set of nodes/clusters/meshes in the hierarchical data structure 15. In one arrangement, the mixed reality device 10 is configured to execute a two-dimensional mapping function associated with a subset of a set of nodes/clusters/meshes in a layout.

Figure 17:
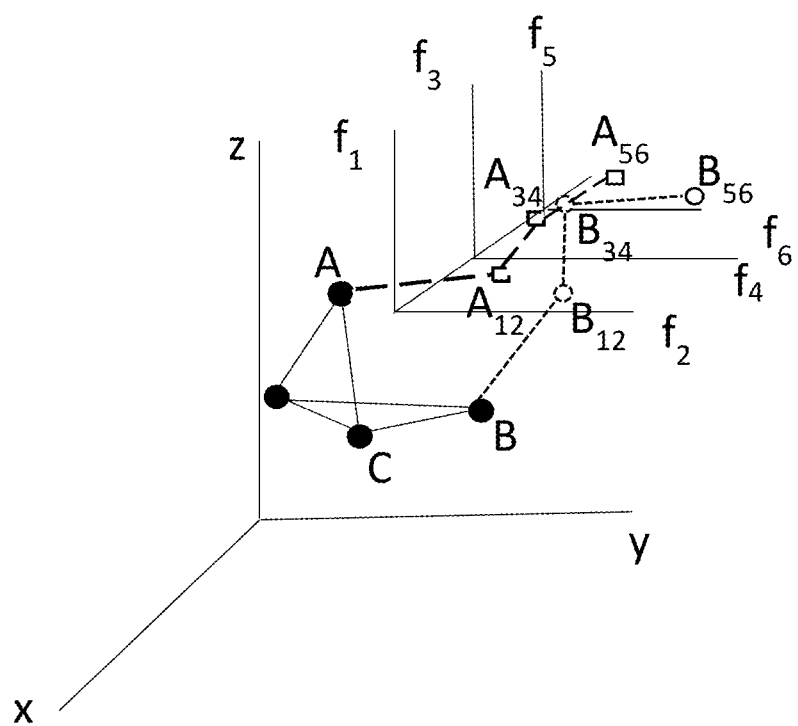
FIG. 17 illustrates mapping of two-dimensional layouts in a three-dimensional environment, according to one arrangement.

FIG. 17 illustrates a network layout of four nodes. Each node has Cartesian coordinates (x, y, z) along with six additional features (f1, f2, f3, f4, f5, f6). When executing the two-dimensional mapping function, the mixed reality device 10 can represent several two-dimensional coordinate systems showing the interrelationships of the features which are aligned in a three-dimensional space. The mixed reality device 10 can further project selected clusters/leaf nodes/meshes on these two-dimensional coordinate systems, depending on their values in corresponding coordinates. With that, as shown in FIG. 17, each cluster/leaf node/mesh in three-dimensional coordinate system is connected with a corresponding projection in the two-dimensional coordinate system, such as with lines. These lines can be distinguished from edges 19 in a variety of ways, such as by thickness, color, shape (e.g., dashed, dotted etc.) or their combinations. The projections of selected clusters/leaf nodes/meshes to the two-dimensional coordinate systems can also be distinguished from each other in a variety of ways, such as by size, color, shape (e.g., sphere, cube, custom shape, etc.).

Application of the two-dimensional mapping function allows a user to visualize and compare multi-dimensional features of selected nodes in a three-dimensional layout at a single time, thereby providing an intuitive and visually transparent interface. For example, FIG. 17 represents six feature (f1, f2, f3, f4, f5, f6) dimensions in three-dimensions. This approach is valuable not only to see absolute values of selected objects, but to compare them. For example, instead of having 10 coordinate systems scattered about a three-dimensional space as displayed by the mixed reality device 10, the mixed reality device 10 can instead arrange the layout in as a cube, which provides the user with the ability to compare all values relatively each other in one convenient location.

With reference to FIG. 17, the following provides an example of the operation of the two-dimensional mapping function:

(1) user provides a voice command "2D MODE"; mixed reality device 10 causes three coordinate systems to appear f1($f2$), f3($f4$), f5($f6$), (2) user selects node A by combining click gesture and gaze selection; mixed reality device 10 causes dashed line and A12, A34 and A56 to appear on f1($f2$), f3($f4$), f5($f6$), (3) user selects node B by combining click gesture and gaze selection; mixed reality device 10 causes dashed line and B12, B34 and B56 to appear on f1($f2$), f3($f4$), f5($f6$), (4) user repeatedly selects node A by combining click gesture and gaze selection; mixed reality device 10 causes dashed line and A12, A34 and A56 to disappear on f1($f2$), f3($f4$), f5($f6$), (5) user repeatedly selects node B by combining click gesture and gaze selection; mixed reality device 10 causes dashed line and B12, B34 and B56 to disappear on f1($f2$), f3($f4$), f5($f6$).

As indicated above, the mixed reality device 10 is configured to apply a statistical manipulation attribute 131 to a mesh element 284 to identify a number of nodes 17 that lie beyond a certain percentile of spatial distribution. In one arrangement, the mixed reality device 10 is configured to apply a statistical manipulation attribute to a hierarchical data structure 15 based on edge features.

For example, each edge 19 in a hierarchical data structure 15 can include feature information which can be represented as color, thickness, and/or length and can be displayed by the mixed reality device 10 based upon receipt of an edge feature display command. In response to a statistical manipulation command, as related to a particular edge feature, the mixed reality device 10 can apply the statistical manipulation attribute to the edges 19 to allow display of the feature pertaining to the command. For example, assume the statistical manipulation command requests the device 10 to display edges 19 having a length over a 95% length percentile. As a result of the statistical manipulation command, the mixed reality device 10 can apply the statistical manipulation attribute to the edges 19 to display the edges 19 of the hierarchical data structure 15 that satisfy the command. As such the mixed reality device 10 can display only the edges 19 that have a length over the 95% length percentile, while setting all remaining edges as invisible.

While various embodiments of the innovation have been particularly shown and described, it will be understood by those skilled in the art that various changes in form and details may be made therein without departing from the spirit and scope of the innovation as defined by the appended claims.

What is claimed is:

1. In a mixed reality device, a method for displaying a network structure, comprising:
    displaying, by the mixed reality device, a hierarchical data structure as a virtual object in a three-dimensional (3D) space on the mixed reality display, the hierarchical data structure constructed from topology data associated with a network and three-dimensional (3D) embedded network data associated with the network;
    receiving, by the mixed reality device, a hierarchy traversal command relative to at least one node of a first level of the hierarchical data structure; and
    in response to receiving the hierarchy traversal command, displaying, by the mixed reality device, at least one node of a second level of the hierarchical data structure on the mixed reality display, wherein:
    receiving the hierarchy traversal command relative to the at least one node of the first level of the hierarchical data structure further comprises, in response to receiving the hierarchy traversal command, identifying, by the mixed reality device, an information link between the first level of the hierarchical data structure and the second level of the hierarchical data structure; and
    displaying, by the mixed reality device, the at least one node of the second level of the hierarchical data structure on the mixed reality display comprises displaying, by the mixed reality device, the at least one node of the second level of the hierarchical data structure on the mixed reality display based upon the information link between the first level of the hierarchical data structure and the second level of the hierarchical data structure.

2. The method of claim 1, wherein displaying the at least one node of the second level of the hierarchical data structure on the mixed reality display comprises displaying all nodes of the second level of the hierarchical data structure on the mixed reality display.

3. The method of claim 1, wherein displaying the hierarchical data structure as the virtual object in the 3D space on the mixed reality display data comprises:
    applying, by the mixed reality device, a clustering function to the topology data and the 3D embedded network data to define a set of nodes and a set of edges representing relationships among certain nodes of the set of nodes;
    defining, by the mixed reality device, a set of levels associated with the hierarchical data structure, each level of the set of levels representing a subset of nodes and a subset of edges of the hierarchical data structure;
    defining, by the mixed reality device, an information link between two neighboring levels of the set of levels; and
    displaying, by the mixed reality device, a level of the hierarchical data structure as the virtual object in the 3D space on a mixed reality display, the level of the hierarchical data structure identifying a subset of nodes.

4. The method of claim 3, comprising:
    applying, by the mixed reality device, a mesh function to a selection of the topology data and the 3D embedded network data to define an outer surface of a mesh element; and
    displaying, by the mixed reality device, the mesh element as a node of the hierarchical data structure.

5. The method of claim 4, comprising:
    applying, by the mixed reality device, a statistical manipulation attribute to the mesh element, the statistical manipulation attribute defining a percentile of spatial distribution associated with the mesh element; and
    displaying, by the mixed reality device, a mixed representation of the mesh element as a node of the hierarchical data structure, the mixed representation of the mesh element identifying percentile of spatial distribution associated with the mesh element and a number of data elements that lie beyond the percentile of spatial distribution.

6. The method of claim 4, comprising:
    applying, by the mixed reality device, a mesh function to the mesh element to generate a spatial distribution attribute for the mesh element; and
    displaying, by the mixed reality device, the spatial distribution attribute as part of the mesh element to can identify a distribution of data elements within the mesh element.

7. The method of claim 6, wherein applying the mesh function to the mesh element to generate the spatial distribution attribute for the mesh element comprises:
    identifying, by the mixed reality device, the mesh element as having a convex shape;
    detecting, by the mixed reality device, a center of mass for the convex mesh element;
    dividing, by the mixed reality device, the convex mesh element into sectors relative to the center of mass;
    identifying, by the mixed reality device, a number of data elements contained within each sector of the convex mesh element; and
    applying, by the mixed reality device, the spatial distribution attribute to the outer surface of the convex mesh element, the spatial distribution attribute based upon the number of identified data elements contained within each sector of the convex mesh element.

8. The method of claim 6, wherein applying the mesh function to the mesh element to generate the spatial distribution attribute for the mesh element comprises:
    identifying, by the mixed reality device, the mesh element as having a non-convex shape;
    detecting, by the mixed reality device, a skeleton for the non-convex mesh element;
    dividing, by the mixed reality device, the non-convex mesh element into sectors relative to the skeleton line;
    identifying, by the mixed reality device, a number of data elements contained within each sector of the non-convex mesh element; and
    applying, by the mixed reality device, the spatial distribution attribute to the outer surface of the non-convex mesh element, the spatial distribution attribute based upon the number of identified data elements contained within each sector of the non-convex mesh element.

9. The method of claim 1, further comprising:
receiving, by the mixed reality device, a linkage command relative to a selected node of the hierarchical data structure;
applying, by the mixed reality device, a linkage feature to the selected node to identify a linked node having a neighboring relationship to the selected node;
displaying, by the mixed reality device, at least one of the selected node and the linked node.

10. The method of claim 1, further comprising:
displaying, by the mixed reality device, two or more two-dimensional coordinate systems showing an inter-relationships of features of at least one node of the hierarchical data structure in a three-dimensional space.

11. A mixed reality device, comprising:
a mixed reality display; and
a controller disposed in electrical communication with the mixed reality display, the controller having a processor disposed in electrical communication with a memory, the controller configured to:
display a hierarchical data structure as a virtual object in a three-dimensional (3D) space on the mixed reality display, the hierarchical data structure constructed from topology data associated with a network and three-dimensional (3D) embedded network data associated with the network;
receive a hierarchy traversal command relative to at least one node of a first level of the hierarchical data structure; and
in response to receiving the hierarchy traversal command, display at least one node of a second level of the hierarchical data structure on the mixed reality display, wherein:
when receiving the hierarchy traversal command relative to the at least one node of the first level of the hierarchical data structure, the controller is configured to, in response to receiving the hierarchy traversal command, identify an information link between the first level of the hierarchical data structure and the second level of the hierarchical data structure; and
when displaying the at least one node of the second level of the hierarchical data structure on the mixed reality display, the controller is configured to display the at least one node of the second level of the hierarchical data structure on the mixed reality display based upon the information link between the first level of the hierarchical data structure and the second level of the hierarchical data structure.

12. The mixed reality device of claim 11, wherein when displaying the at least one node of the second level of the hierarchical data structure on the mixed reality display, the controller is configured to display all nodes of the second level of the hierarchical data structure on the mixed reality display.

13. The mixed reality device of claim 11, wherein when displaying the hierarchical data structure as the virtual object in the 3D space on the mixed reality display data, the controller is configured to:
apply a clustering function to the topology data and the 3D embedded network data to define a set of nodes and a set of edges representing relationships among certain nodes of the set of nodes;
define a set of levels associated with the hierarchical data structure, each level of the set of levels representing a subset of nodes and a subset of edges of the hierarchical data structure;
define an information link between two neighboring levels of the set of levels; and
display a level of the hierarchical data structure as the virtual object in the 3D space on a mixed reality display, the level of the hierarchical data structure identifying a subset of nodes.

14. The mixed reality device of claim 13, wherein the controller is configured to:
apply a mesh function to a selection of the topology data and the 3D embedded network data to define an outer surface of a mesh element; and
display the mesh element as a node of the hierarchical data structure.

15. The mixed reality device of claim 14, wherein the controller is configured to:
apply a statistical manipulation attribute to the mesh element, the statistical manipulation attribute defining a percentile of spatial distribution associated with the mesh element; and
display a mixed representation of the mesh element as a node of the hierarchical data structure, the mixed representation of the mesh element identifying percentile of spatial distribution associated with the mesh element and a number of data elements that lie beyond the percentile of spatial distribution.

16. The mixed reality device of claim 14, wherein the controller is configured to:
apply a mesh function to the mesh element to generate a spatial distribution attribute for the mesh element; and
display the spatial distribution attribute as part of the mesh element to can identify a distribution of data elements within the mesh element.

17. The mixed reality device of claim 16, wherein when applying the mesh function to the mesh element to generate the spatial distribution attribute for the mesh element, the controller is configured to:
identify the mesh element as having a convex shape;
detect a center of mass for the convex mesh element;
divide the convex mesh element into sectors relative to the center of mass;
identify a number of data elements contained within each sector of the convex mesh element; and
apply the spatial distribution attribute to the outer surface of the convex mesh element, the spatial distribution attribute based upon the number of identified data elements contained within each sector of the convex mesh element.

18. The mixed reality device of claim 16, wherein when applying the mesh function to the mesh element to generate the spatial distribution attribute for the mesh element, the controller is configured to:
identify the mesh element as having a non-convex shape;
detect a skeleton for the non-convex mesh element;
divide the non-convex mesh element into sectors relative to the skeleton line;
identify a number of data elements contained within each sector of the non-convex mesh element; and
apply the spatial distribution attribute to the outer surface of the non-convex mesh element, the spatial distribution attribute based upon the number of identified data elements contained within each sector of the non-convex mesh element.

19. The mixed reality device of claim 11, wherein the controller is further configured to:
- receive a linkage command relative to a selected node of the hierarchical data structure;
- apply a linkage feature to the selected node to identify a linked node having a neighboring relationship to the selected node;
- display at least one of the selected node and the linked node.

20. The mixed reality device of claim 11, wherein the controller is further configured to:
- display two or more two-dimensional coordinate systems showing an interrelationships of features of at least one node of the hierarchical data structure in a three-dimensional space.

21. A computer program product having a non-transitory computer-readable medium including computer program logic encoded thereon that, when performed on a controller of a mixed reality device causes the mixed reality device to:
- display a hierarchical data structure as a virtual object in a three-dimensional (3D) space on the mixed reality display, the hierarchical data structure constructed from topology data associated with a network and three-dimensional (3D) embedded network data associated with the network;
- receive a hierarchy traversal command relative to at least one node of a first level of the hierarchical data structure; and
- in response to receiving the hierarchy traversal command, display at least one node of a second level of the hierarchical data structure on the mixed reality display, wherein:
- when receiving the hierarchy traversal command relative to the at least one node of the first level of the hierarchical data structure, the mixed reality device is configured to, in response to receiving the hierarchy traversal command, identify an information link between the first level of the hierarchical data structure and the second level of the hierarchical data structure; and
- when displaying the at least one node of the second level of the hierarchical data structure on the mixed reality display, the mixed reality device is configured to display the at least one node of the second level of the hierarchical data structure on the mixed reality display based upon the information link between the first level of the hierarchical data structure and the second level of the hierarchical data structure.

22. In a mixed reality device, a method for displaying a network structure, comprising:
- displaying, by the mixed reality device, a hierarchical data structure as a virtual object in a three-dimensional (3D) space on the mixed reality display, the hierarchical data structure constructed from topology data associated with a network and three-dimensional (3D) embedded network data associated with the network;
- receiving, by the mixed reality device, a hierarchy traversal command relative to at least one node of a first level of the hierarchical data structure; and
- in response to receiving the hierarchy traversal command, displaying, by the mixed reality device, at least one node of a second level of the hierarchical data structure on the mixed reality display;
- wherein displaying the hierarchical data structure as the virtual object in the 3D space on the mixed reality display data comprises:
- applying, by the mixed reality device, a clustering function to the topology data and the 3D embedded network data to define a set of nodes and a set of edges representing relationships among certain nodes of the set of nodes;
- defining, by the mixed reality device, a set of levels associated with the hierarchical data structure, each level of the set of levels representing a subset of nodes and a subset of edges of the hierarchical data structure;
- defining, by the mixed reality device, an information link between two neighboring levels of the set of levels; and
- displaying, by the mixed reality device, a level of the hierarchical data structure as the virtual object in the 3D space on a mixed reality display, the level of the hierarchical data structure identifying a subset of nodes.

23. In a mixed reality device, a method for displaying a network structure, comprising:
- displaying, by the mixed reality device, a hierarchical data structure as a virtual object in a three-dimensional (3D) space on the mixed reality display, the hierarchical data structure constructed from topology data associated with a network and three-dimensional (3D) embedded network data associated with the network;
- receiving, by the mixed reality device, a hierarchy traversal command relative to at least one node of a first level of the hierarchical data structure;
- in response to receiving the hierarchy traversal command, displaying, by the mixed reality device, at least one node of a second level of the hierarchical data structure on the mixed reality display;
- receiving, by the mixed reality device, a linkage command relative to a selected node of the hierarchical data structure;
- applying, by the mixed reality device, a linkage feature to the selected node to identify a linked node having a neighboring relationship to the selected node;
- displaying, by the mixed reality device, at least one of the selected node and the linked node.

24. A mixed reality device, comprising:
- a mixed reality display; and
- a controller disposed in electrical communication with the mixed reality display, the controller having a processor disposed in electrical communication with a memory, the controller configured to:
- display a hierarchical data structure as a virtual object in a three-dimensional (3D) space on the mixed reality display, the hierarchical data structure constructed from topology data associated with a network and three-dimensional (3D) embedded network data associated with the network;
- receive a hierarchy traversal command relative to at least one node of a first level of the hierarchical data structure; and
- in response to receiving the hierarchy traversal command, display at least one node of a second level of the hierarchical data structure on the mixed reality display;
- wherein when displaying the hierarchical data structure as the virtual object in the 3D space on the mixed reality display data, the controller is configured to:
- apply a clustering function to the topology data and the 3D embedded network data to define a set of nodes and a set of edges representing relationships among certain nodes of the set of nodes;

define a set of levels associated with the hierarchical data structure, each level of the set of levels representing a subset of nodes and a subset of edges of the hierarchical data structure;

define an information link between two neighboring levels of the set of levels; and display a level of the hierarchical data structure as the virtual object in the 3D space on a mixed reality display, the level of the hierarchical data structure identifying a subset of nodes.

25. A mixed reality device, comprising:

a mixed reality display; and a controller disposed in electrical communication with the mixed reality display, the controller having a processor disposed in electrical communication with a memory, the controller configured to:

display a hierarchical data structure as a virtual object in a three-dimensional (3D) space on the mixed reality display, the hierarchical data structure constructed from topology data associated with a network and three-dimensional (3D) embedded network data associated with the network;

receive a hierarchy traversal command relative to at least one node of a first level of the hierarchical data structure; and in response to receiving the hierarchy traversal command, display at least one node of a second level of the hierarchical data structure on the mixed reality display;

wherein the controller is further configured to:

receive a linkage command relative to a selected node of the hierarchical data structure;

apply a linkage feature to the selected node to identify a linked node having a neighboring relationship to the selected node;

display at least one of the selected node and the linked node.

* * * * *